(12) United States Patent
Holindrake et al.

(10) Patent No.: US 8,055,389 B2
(45) Date of Patent: Nov. 8, 2011

(54) METHOD AND APPARATUS FOR CONTROLLING IRRIGATION

(75) Inventors: Erik Holindrake, San Diego, CA (US); Mike O'Brien, Carlsbad, CA (US); David Levy, Encinitas, CA (US); Craig E. Beal, Oceanside, CA (US)

(73) Assignee: DIG Corporation, Vista, CA (US)

( * ) Notice: Subject to any disclaimer, the term of this patent is extended or adjusted under 35 U.S.C. 154(b) by 1108 days.

(21) Appl. No.: 11/515,483

(22) Filed: Sep. 1, 2006

(65) Prior Publication Data

US 2008/0058995 A1    Mar. 6, 2008

(51) Int. Cl.
- *A01G 27/00* (2006.01)
- *F16K 31/48* (2006.01)
- *G05D 7/00* (2006.01)
- *H02J 7/00* (2006.01)

(52) U.S. Cl. .................. 700/284; 137/624.11; 239/69; 307/66

(58) Field of Classification Search .......... 700/284, 700/283; 239/225.1, 69, 70; 713/324; 137/624.11; 307/66, 130; 361/187
See application file for complete search history.

(56) References Cited

U.S. PATENT DOCUMENTS

| | | | |
|---|---|---|---|
| 3,313,939 A * | 4/1967 | Spencer | 250/214 SG |
| 3,860,863 A * | 1/1975 | Lamprecht | 250/214 SG |
| 4,245,286 A * | 1/1981 | Paulkovich et al. | 363/21.11 |
| 4,847,546 A * | 7/1989 | Bobier et al. | 320/102 |
| 5,229,649 A | 7/1993 | Nielsen et al. | |
| 5,402,303 A | 3/1995 | Luck et al. | |
| 5,661,349 A | 8/1997 | Luck | |
| 5,801,519 A * | 9/1998 | Midya et al. | 323/222 |
| 5,960,813 A | 10/1999 | Sturman et al. | |
| 6,104,759 A | 8/2000 | Carkner et al. | |
| 6,257,264 B1 * | 7/2001 | Sturman et al. | 137/1 |
| 6,452,499 B1 | 9/2002 | Runge et al. | |
| 6,617,832 B1 * | 9/2003 | Kobayashi | 323/266 |
| 6,856,654 B1 | 2/2005 | Carkner et al. | |
| 6,993,416 B2 * | 1/2006 | Christiansen | 700/284 |
| 7,010,394 B1 * | 3/2006 | Runge et al. | 700/284 |
| 2006/0202051 A1 * | 9/2006 | Parsons et al. | 239/69 |
| 2009/0222141 A1 * | 9/2009 | Ensworth et al. | 700/284 |

* cited by examiner

*Primary Examiner* — Ramesh Patel
*Assistant Examiner* — Jennifer Norton
(74) *Attorney, Agent, or Firm* — Knobbe Martens Olson & Bear LLP

(57) ABSTRACT

The invention comprises devices and methods for providing operational power to a solar-powered irrigation control system. In one aspect, a method includes producing electrical energy from light, storing the electrical energy in a capacitive module, and operating an irrigation controller using the stored electrical energy independent of another power source. In another aspect, a device includes a control system comprising a computer having a programmed irrigation schedule which operates at least one irrigation device, a photovoltaic power module, and a capacitive module connected to said photovoltaic power module to store the electrical energy provided by the photovoltaic power module, where the capacitive module provides power for the control system to operate the at least one irrigation device independent of another power source.

30 Claims, 20 Drawing Sheets

METHOD AND APPARATUS FOR CONTROLLING IRRIGATION

BACKGROUND

1. Field of the Invention

The present invention relates to solar-powered irrigation control systems, and in particular to low-energy irrigation systems that operate using electrical energy derived from light and stored in one or more capacitors.

2. Description of the Related Technology

Irrigation systems are used widely in commercial and residential applications. Typical irrigation systems include an irrigation controller connected to one or more irrigation devices (e.g., valves) which provide water to desired locations via an assortment of hydraulic components (e.g., pipes, sprinkler heads, and drip lines). The irrigation controllers control the components to provide desired irrigation in accordance with a programmed schedule. In areas where electrical power is available, most irrigation controllers are powered by alternating current (AC) through a wired connection, or by direct current (DC) which is typically provided by a DC power supply connected to a wired AC power source. In systems with a wired AC or DC power source, the energy efficiency of the irrigation controller is usually not a concern.

In remote locations where a wired AC or DC power source is not readily available, or where placed in locations where providing a wired source is not convenient, some irrigation controllers are configured with a solar power system that converts light energy to electrical energy and stores the electrical energy in a battery contained in the irrigation controller. The irrigation controller uses the battery as a DC power source to power its operations. Some irrigation systems use a combination of one or more batteries with other power storage/providing devices to power the irrigation controller. The energy efficiency of a battery powered irrigation system can be more critical because there is a finite amount of power available at a given time. However, this problem can be generally overcome by using a solar panel and battery sized to generate and store a large amount of power (relative to the expected use), so that energy efficiency of the irrigation controller is again not a concern.

Although widely used, having a battery in an irrigation controller, whether as a stand-alone power storage device or in addition to another power storage device, can be problematic. Rechargeable batteries have a limited lifespan and can be charged and discharged a finite number of times, despite advances in battery technology. An irrigation controller having a battery requires periodic maintenance to change the battery once it is depleted. Such maintenance can be time-consuming and expensive, especially for irrigation systems that are located in remote areas and include numerous irrigation controllers. Also, batteries can leak hazardous material which can erode proximate electrical components and in some cases ruin the irrigation controller. High quality rechargeable batteries can be expensive, heavy, and large which can impact the design of a compact irrigation controller designed to blend in with its surrounding. It would be beneficial to the art to provide a solar powered irrigation controller that does not require a battery power source to overcome the above-mentioned problems and other problems in the art.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In one aspect, an irrigation controller includes a power system for providing electrical energy, the power system comprising a photovoltaic power module and a power storage device comprising a capacitive module connected across the photovoltaic power module, the capacitive module being configured to store electrical energy generated by the photovoltaic power module, and the irrigation controller also includes a control system comprising a communication module configured to receive operational signals, a timing component configured to provide a time signal, a boost module configured to receive electrical energy from the power system at a first voltage level, an actuation module comprising at least one capacitor, the actuation module configured to receive electrical energy from the boost module at the second voltage level to charge the at least one capacitor, the actuation module further configured to provide an output pulse (e.g., between about 7.5 to about 15 volts) to operate at least one irrigation control device in an irrigation system, a computer configured to operate at least one irrigation flow device based at least in part on the operational signals and the time signal, where electrical energy generated by the photovoltaic device and stored in the capacitive module is used to operate the irrigation controller independent of another power source. The irrigation controller can further include a voltage regulator configured to receive electrical energy from the power system and provide a regulated voltage output to the computer and the communication module. In some embodiments, the voltage regulator comprises a LDO regulator. The computer can be a microcontroller. The timing component can be a real time clock or another timing device capable of providing a timing signal. The irrigation controller can further include a linear voltage regulator configured to receive electrical energy from the power system and provide a regulated voltage output to the computer, and a switching voltage regulator configured to receive electrical energy from the power system and provide a regulated voltage output to the communication module. In some embodiments, the boost module provides power at the second voltage level that is greater than the first voltage level. In other embodiments, a buck module receives power at a first voltage level and provides power at a second voltage level, where the first voltage level is less than the second voltage level.

In some implementations, the capacitive module can include at least two capacitors connected in series and connected across the photovoltaic power module. The capacitive module can further include a diode connected in parallel with the at least two capacitors and a cell balancing module connected to each of the at least two capacitors and configured to maintain a consistent voltage across each of the at least capacitors.

In some embodiments, the irrigation controller can be configured to monitor a voltage level of the power storage device and to control operations of the control system based on the monitored voltage level. Controlling operations can include operating the communication module in a first state (e.g., an activated state) when the monitored voltage level exceeds a predetermined voltage level, and operating the communication module in a second state (e.g., a deactivated state) when the voltage level of the power storage device is less than a predetermined voltage level. Controlling operations can also include performing an orderly shutdown procedure of the control system if the monitored voltage level is at a predetermined first voltage level and then falls below the predetermined first voltage level. Controlling operations can also include performing a startup procedure if the control system is in a shutdown state and the voltage level exceeds a predetermined voltage level, for example, about 2.5 volts, or about 2 volts or less. In some embodiments, the voltage level for operating the communication module in an activated state can be about 4.2 volts.

In some embodiments, the communication module includes a radio transceiver. In other embodiments, the communication module includes an interface configured to input operational signals, and an LED screen configured to display operational information related to operational signals input using the one or more controls.

In another embodiment, a method of operating an irrigation controller to control one or more irrigation devices in an irrigation system includes producing electrical energy from light, storing the electrical energy in a capacitive module, and operating the irrigation controller using the stored electrical energy independent of another power source. Operating the irrigation controller can include charging a capacitive capable of actuating of an irrigation device using the stored electrical energy, receiving operational signals, the operational signals comprising operational information for operating the irrigation device, receiving timing signals, and discharging the capacitor to actuate the irrigation device at a predetermined time based on the operational information and the timing signals. The operational signals can be received over a wireless communication network by an IR or RF network, or another suitable wireless network. In some embodiments, operating the irrigation controller can include monitoring a voltage level of the capacitive module, and implementing a power saving configuration based on the monitored voltage level. In some embodiments, implementing a power saving configuration includes de-activating receiving operational signals if the monitored voltage level is below a communication threshold level, activating receiving operational signals if the monitored voltage level is above the communication threshold level, implementing an orderly system shutdown if the monitored voltage level is below a system shutdown threshold, wherein the shutdown comprises shutting all irrigation devices in the irrigation system and configuring the system for a graceful shutdown to a sleep state, and implementing a system startup process if the monitored voltage level is above a system startup threshold.

In another embodiment, an irrigation controller for controlling at least one solenoid actuated valve based on a programmed irrigation schedule includes a control system comprising a microcontroller having a programmed irrigation schedule, a photovoltaic power module providing electrical power, and a capacitive module connected to the photovoltaic power module to store the electrical energy provided by the photovoltaic power module, wherein the capacitive module provides all the power required for the control system to operate the at least one solenoid actuated valve.

In another embodiment, a device for controlling an irrigation system includes means for producing electrical energy from light, means for storing the electrical energy in a capacitive module, and means for operating the irrigation controller using the stored electrical energy independent of another power source. The device can also include means for charging an actuation capacitor for operating a solenoid actuated valve using the electrical energy storing means, means for receiving one or more operational signals using energy stored in the capacitive module, means for providing time information, and means for providing event interrupts, where the operating means is configured to use the one or more operational signals, the time information, and the event interrupts to operate the solenoid actuated valve at a predetermined time to control a flow of water in the irrigation system. Additionally, the device can include means for monitoring a voltage level of the capacitive module and means for implementing a power saving process based on the monitored voltage level.

In another embodiment, an irrigation system includes an irrigation controller that includes a power system comprising a photovoltaic power module, and a power storage device comprising a capacitive module connected across said photovoltaic power module, said capacitive module configured to store electrical energy generated by said photovoltaic power module, a control system comprising a communication module configured to receive operational signals, a timing component configured to provide a time signal, and a computer configured to operate at least one irrigation flow device based at least in part on said operational signals and said time signal, wherein electrical energy generated by said photovoltaic device and stored in said capacitive module is used to operate the irrigation controller independent of another power source, also the irrigation system also includes a mobile handset comprising a display and a user interface configured to accept user commands, said handset being configured to communicate operational signals to said irrigation controller to program the operation of said irrigation controller and receive operational information from said irrigation controller.

DETAILED DESCRIPTION OF CERTAIN EMBODIMENTS

Figure 1:
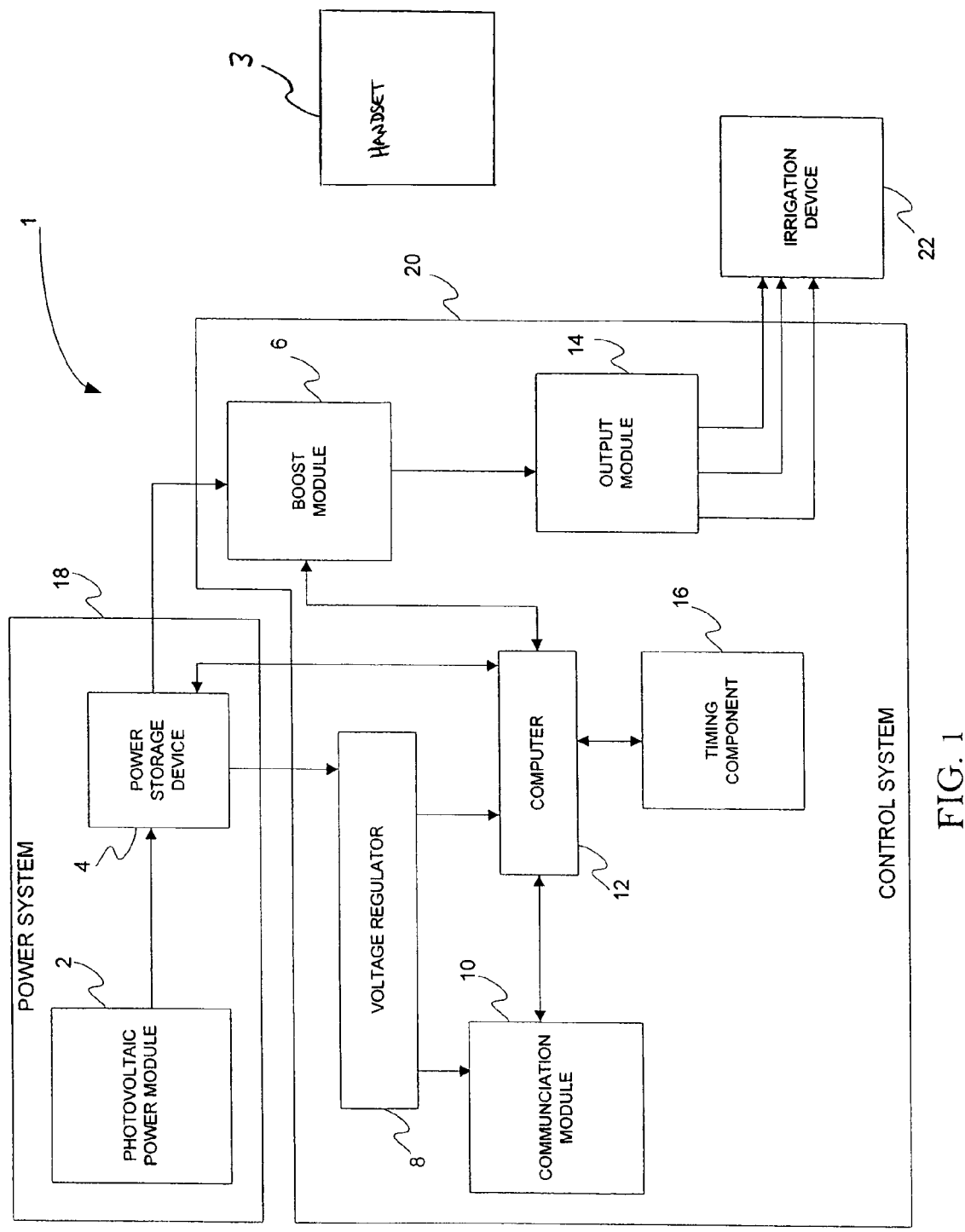
FIG. 1 is a block diagram of a system for controlling irrigation.

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to store energy and use the stored energy to power control circuitry and processes. More particularly, it is contemplated that the embodiments may be implemented in or associated with a variety of remotely located electrical systems such as, but not limited to, irrigation systems, electrical switching systems, lighting systems, communication systems, and valve control systems.

Solar powered irrigation controllers are becoming widely used, especially in remote locations where a wired power source is not readily available. Described herein are certain embodiments of an energy efficient solar powered irrigation controller that can fully operate without a battery or the input of another outside power source that provides temporary or permanent power to the irrigation controller. The irrigation controller uses a photovoltaic module ("PVM") to convert light to electrical energy and a power supply device comprising a capacitive module to store the electrical energy provided by the PVM and provide the electrical energy to operate components of the irrigation controller, as needed. The irrigation controller is configured to operate using only the electrical energy generated by the PVM. In other words, the irrigation controller is configured to operate independent of another power source. The power storage device stores electrical energy in one or more capacitors capable of storing a relatively large amount of electrical energy, for example, one or more super capacitors. The irrigation controller is specifically designed for extremely low energy usage and includes energy saving operational processes. The energy stored in the capacitive module is used to operate all aspects of the irrigation controller so that the irrigation controller does not need any other power source, such as a battery, a hard wired power supply, or even a temporary plug-in power source. The super capacitors can be arranged in a series configuration for optimum operational efficiency. The irrigation controller described herein is compact so that it can be easily fitted in a small housing which can be discretely located to control one or more irrigation devices, such as a solenoid activated valve. The irrigation controller can include a microprocessor configured to control internal program operations and external irrigation operations, and a radio transceiver to receive programming instructions and provide data to a corresponding communication device (e.g., a wireless handset) operated by a user. Illustrative embodiments and certain aspects of the invention are further described hereinbelow.

FIG. 1 is a block diagram illustrating a low-energy solar-powered irrigation controller 1 that can be connected to one or more irrigation device 22, and a handset 3 that can be used to control the irrigation controller 1. The irrigation controller 1 includes a power system 18 that generates and stores electrical energy, and a control system 20 that operates the one or more irrigation device 22. As described further below, the control system 20 performs many functions including controlling irrigation devices. Typically, the irrigation controller 1 actuates an irrigation device 22 in accordance with a predetermined or a programmed irrigation schedule. In some embodiments, the irrigation controller 1 is configured to receive a signal indicating to actuate irrigation device 22 immediately or at a particular time that was not previously scheduled. In some embodiments, the irrigation device 22 is a solenoid-actuated diaphragm valve that the control system 20 opens and closes at a particular time.

The irrigation controller 1 includes a power system 18 that generates and stores electrical power that can be used to fully operate the irrigation controller 1 so that an additional power source (e.g., a battery installed in the irrigation controller, a wired or wireless power source connected to the irrigation controller, a portable power source that can be connected to the irrigation controller, or any other type of electrical power source that provides, either permanently or temporarily, electrical energy that is used by the irrigation controller 1) is not needed. The power system 18 includes a photovoltaic power module ("PVM") 2 that produces electrical power from light, and a power storage device 4, connected to the PVM 2 that stores the electrical power produced by the PVM 2. A very small PVM can be used in the described embodiments partly because of the energy efficient design of the irrigation controller 1 and its numerous power saving processes. The PVM 2 is generally small in size so that it can readily fit in a relatively small housing formed to hold the irrigation controller 1. In some embodiments, PVM 2 comprises a surface area of about 10,000 mm$^2$ or less. In some embodiments, PVM 2 comprises a surface area of about 5700 mm$^2$ or less. Using a small PVM reduces manufacturing costs and allows the PVM to be used in relatively small irrigation controller configurations. In some embodiments, the PVM 2 comprises length and width dimensions of about 97 mm×58 mm, and is about 2 mm thick. PVM 2 can have an operating voltage of about 7.0 volts, an operating current of about 25.0 mA, an open circuit voltage of about 8.5 volts, and a short circuit current of about 32.0 mA. In some embodiments, the PVM 2 comprises a solar cell from Sinonar of Hsinchu, Taiwan, part no. SC-9758-A, which has an operational voltage of 7 V and a short circuit current of 32 mA at 100,000 lux. Typically PVMs are not very efficient converters of light to energy. Although current technology allows the PVM to operate at about 15% efficiency, it is contemplated that higher efficiency PVMs will become available in the future decreasing the size needed to produce sufficient electrical energy to power the irrigation controller 1.

Figure 2:
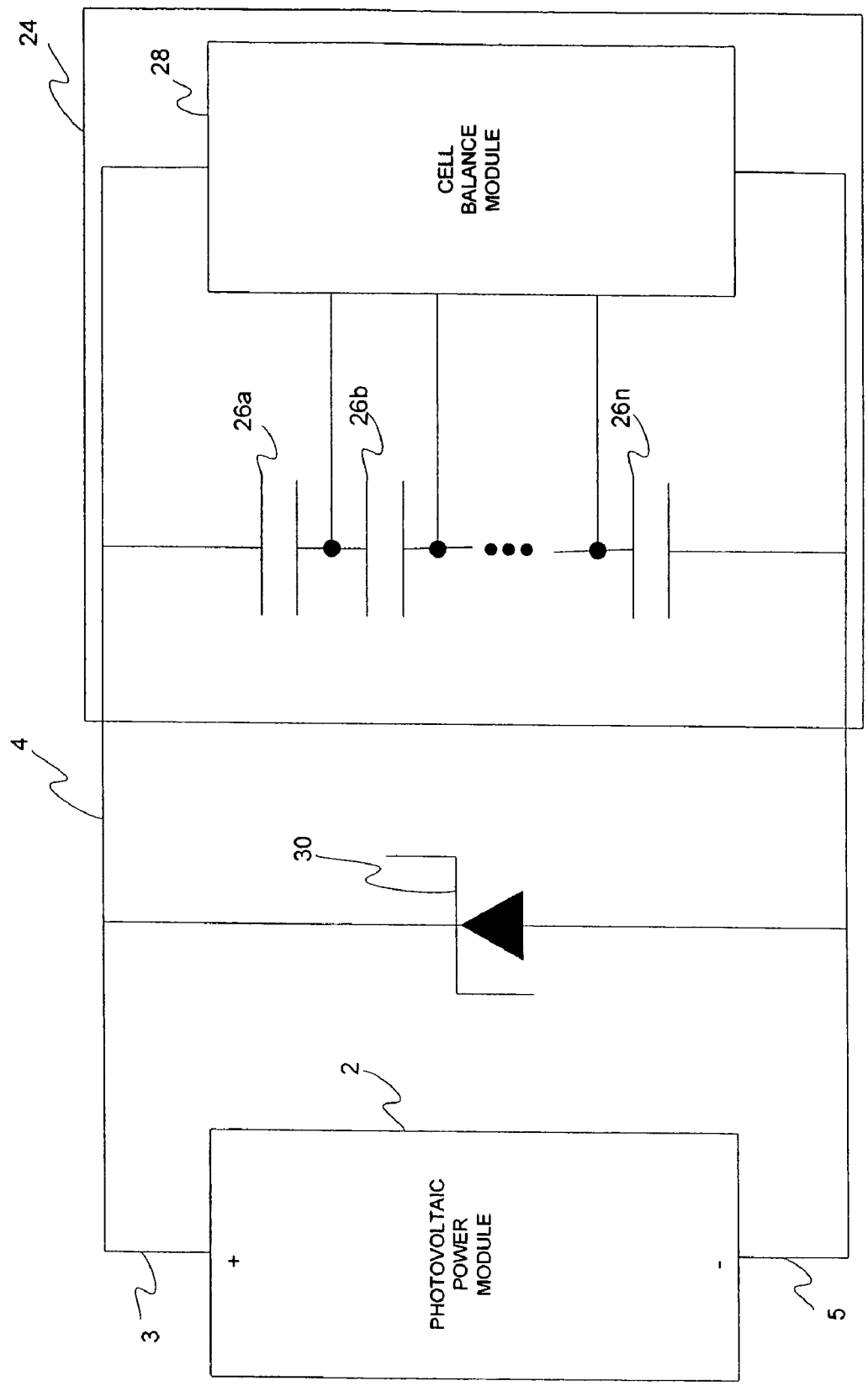
FIG. 2 is a block diagram of a power system for an irrigation controller.

The power system 18 shown in FIG. 1 is further illustrated in FIG. 2. The power storage device 4 is connected across PVM 2 conductive contacts 3, 5 to receive electrical energy produced by the PVM 2. The power storage device 18 includes a capacitive module 24 and a diode 30 connected in parallel. In some embodiments the capacitive module 24 includes a plurality of capacitors 26a, 26b, . . . , 26n connected in series. In particular, the capacitive module 24 comprises at least one capacitor that is capable of storing a relatively large amount of electrical energy, such as a super capacitor described herein. In certain embodiments, the capacitive module 24 comprises at least two capacitors (e.g., 26a, 26b) connected in series, and a cell balance module 28 connected across each of the capacitors for keeping the voltage equal between the capacitors. The capacitors are protected from an over voltage condition by a diode 30 (e.g., a Zener diode) connected across the conductive contacts 3, 5.

In some embodiments, the capacitive module 24 includes three super capacitors connected in series, each capacitor rated at 2.5V, 10 F, to provide an effective voltage of 7.5 V and a capacitance of 3⅓ F. One example of such super capacitors are BOOSTCAP® Ultracapacitors from Maxell Technologies of San Diego, Calif. NessCap of Korea also supplies suitable capacitors. Such super capacitors can achieve over 500,000 duty cycles and have a ten year life capability. In some embodiments, the capacitors can each have different electrical characteristics including different capacitances and/or different voltages, however, circuit design can be easier if they are configured with the same characteristics. In certain embodiments, the capacitive module 24 includes two capacitors, or can include four or more capacitors, configured in series. In some embodiments, the capacitive module can include a single capacitor, and in such an embodiment the cell balance module 28 may not be included. In some embodiments, the capacitive module 24 capacitors (e.g., super capacitors) configured in parallel, which in one example are configured to collectively provide 7.5 V and a capacitance of 3⅓ F.

Referring again to FIG. 1, the irrigation controller 1 also includes control system 20 for controlling at least a portion of an irrigation system, for example, one or more solenoid controlled irrigation valves. A voltage regulator 8 in the control system 20 is connected to the power system 18 and provides regulated power to a radio transceiver 10 and a computer 12. A timing component 16, for example, a real time clock, provides the computer 12 with a timing signal. Although the timing component 16 is illustrated in FIG. 1 as separate from the computer 12, in some embodiments the timing component 16 is configured as part of the computer 12. The control system 20 further includes a boost module 6 also connected to the power system 18. The boost module 6 receives power directly from the power system 18 at a first voltage level, and provides a voltage at a second "boosted" voltage level (e.g., the second voltage level having a greater magnitude than the first voltage level) to an output module 14, which is used to actuate at least one irrigation device 22 connected to the irrigation controller 1. In some alternative embodiments, a buck module is used that receives power at a first voltage level and provides the voltage at a second voltage level which is less than the first voltage level.

Figure 3:
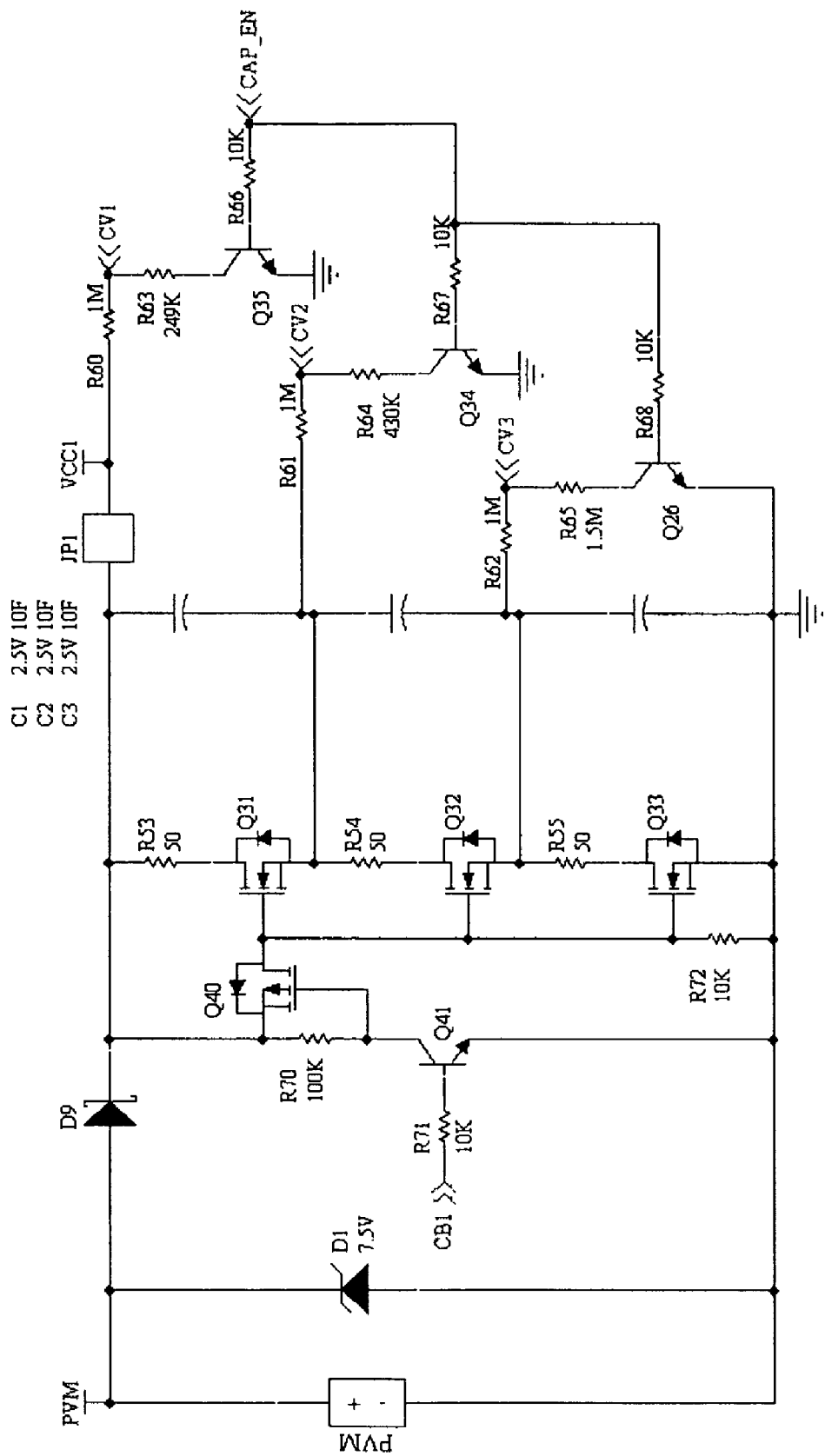
FIG. 3 is a schematic of one example of a power system for an irrigation controller.

FIG. 3 is a schematic of one example of a power system 18 for the irrigation controller 1 illustrated in FIG. 1. The power system 18 includes a PVM that converts light to electrical energy and a capacitive module that includes three 2.5V 10 F super capacitors C1, C2, and C3. The power system provides all the power needed to operate the irrigation controller 1 independent of another power source. During operation, the voltages across the three capacitors are balanced to ensure that none of the capacitors is charged above its operating voltage (e.g., 2.5V). Although voltage balancing can be done in a number of ways, balancing configurations that constantly draw current can use too much power.

In power system 18 illustrated in FIG. 3, the computer 12 (e.g., a microcontroller) balances the voltage across the capacitors by obtaining an indication of the voltage of each capacitor at a certain time and then performing a corresponding balancing action if required, so that there is not a constant current draw. An A/D conversion process associated with measuring the voltage has a short duration (e.g., a few microseconds) so power usage is minimal. The computer 12 can be configured reduce power consumption by selecting a sampling interval for obtaining the indication of each capacitor voltage depending on the current state. For example, when voltage balancing is needed (e.g., when any capacitor is nearly fully charged) the interval can be smaller, and when voltage balancing is not needed (e.g., the voltage level of none of the capacitors is near 2.5 volts) the sampling interval can be larger, further reducing power consumption. A voltage divider R60&R63, R61&R64, R62&R65 connected to each super capacitor C1, C2, C3 divides the capacitors voltage to an indicative voltage level the computer 12 can sample. The sampled voltage can then be multiplied in software (or hardware) to determine the actual voltage across each capacitor. The voltage difference between two capacitors (C1&C2, C2&C3, and C3& GND) gives the voltage across the capacitors. In some embodiments, to reduce current even further, the CAP_EN line disables the voltage dividers when they are not needed, so that the voltage divider resistors will draw no current until they needed for an A/D measurement.

In this embodiment, there is a resistor R53, R54, R55 connected across each capacitor C1, C2, C3, respectively. They are disabled from conducting any current by transistors Q31, Q32 and Q33. When voltage is applied to CB1 the transistors conduct and balance the voltage of each capacitor. When the computer 12 determines a voltage is too high and balancing is needed, the computer 12 changes the state of the transistor by applying voltage CB1 as required allowing current to flow and reducing voltage from the corresponding capacitor to a safe state. This protects from an over voltage condition. Note that in the embodiment shown in FIG. 3, due to the limit of pins on the computer 12 in this embodiment, two capacitors C1, C2 are balanced by the same computer output (e.g., a microcontroller pin). In some embodiments, the computer 12 is configured with a pin such that it can balance each capacitor separately.

Figure 4:
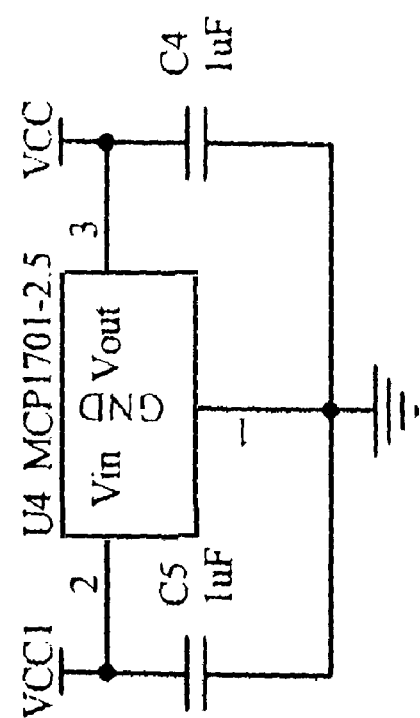
FIG. 4 is a schematic of an example of a voltage regulator for an irrigation controller.

FIG. 4 is a schematic of an example of circuitry comprising voltage regulator 8 for the irrigation controller 1 of FIG. 1. In this embodiment, voltage regulator 8 can receive current at voltages of up to 7.5V from the power system 18 (e.g., for a super capacitor configuration shown in FIG. 3) and provides current regulated at 2.5V to components in the control system 20. For example, as illustrated in FIG. 1 the communication module 10 and the computer 12 receive regulated current from the voltage regulator 8.

Generally, there are two types of voltage regulators, switching and linear. Switching regulators are typically much more efficient than linear. Switching regulators can achieve efficiencies of about 90% or higher, require a minimum quiescent current to keep running, and often are more expensive. Linear regulators are far less efficient, having efficiencies closer to 50-60% at best. However, linear regulators can offer lower quiescent current than switching regulators and are much cheaper. Examples of linear regulators include standard, low-dropout ("LDO"), and quasi LDO. One difference between these linear regulators is the voltage drop required across the regulator to maintain output voltage regulation. The LDO regulator typically operates with the least voltage across it, dissipating the least internal power and has the highest efficiency. Even though a LDO is less efficient than a switching regulator, it can draw less current overall, for example, an LDO having 40% inefficiency on a few μA draws less current than a switching regulator constantly running at higher quiescent current. In some embodiments, such as the example configuration illustrated in FIG. 4, the irrigation controller 1 is designed for a voltage regulator 8 comprising Microchip Technology Incorporated's MCP1701 voltage regulator, an LDO regulator having a sufficiently low current draw (about 2.0 μA quiescent current). With such a low current draw, the voltage regulator allows the control system 20 to run at about 4-5 μA when the communication module 10 is not activated.

Typically, the voltage regulator 8 provides power to the communication module 10. However, in some embodiments, a separate switching regulator (not shown) in the control system 20 can provide regulated power to the communication module 10. The communication module 10 can comprise a radio transceiver which can use a relatively large amount of power. For example, in some configurations the transceiver uses about 15 mA when it is activated. In such a configuration, a 40% inefficiency (a typical inefficiency of an LDO regulator) applied to a current of 15 mA can be significant. Having two voltage regulators in the control system 20, an LDO for the computer 12 and a linear regulator for the communication module 10 can provide increased power efficiency, although such a configuration is typically more expensive to manufacture.

Figure 5:
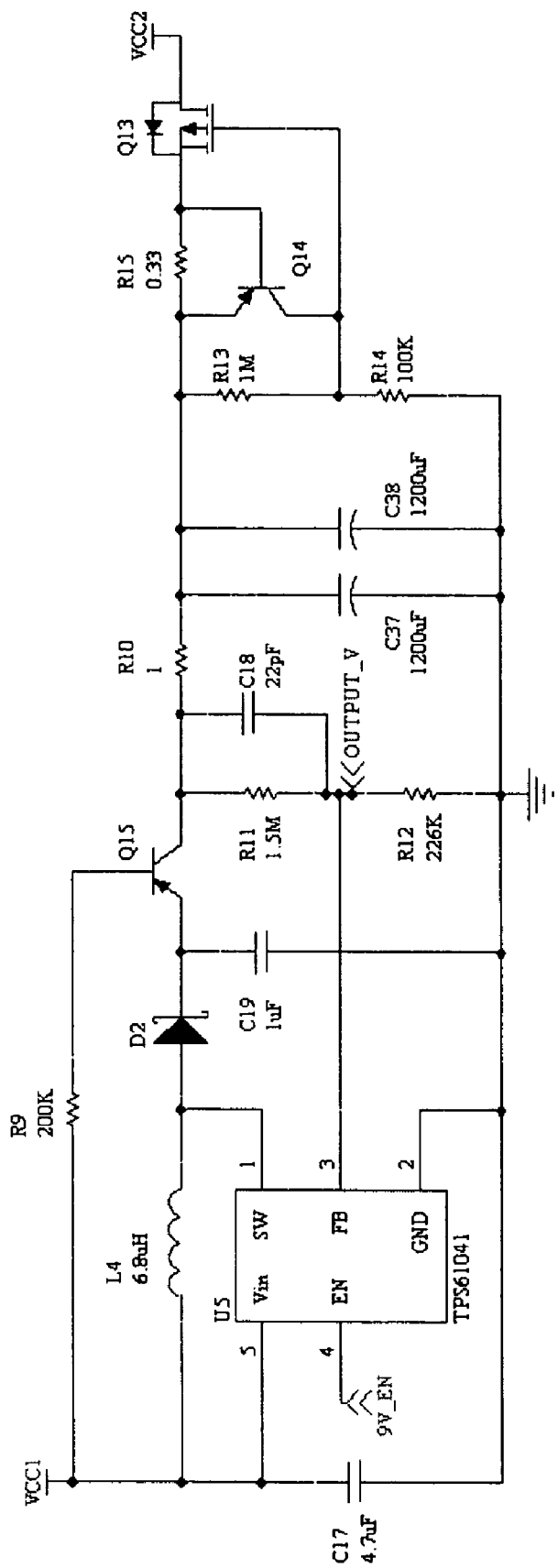
FIG. 5 is a schematic of an example of a voltage boost circuit for an irrigation controller.

FIG. 5 is a circuit schematic of one example of a boost module 6 that can be included in the control system 20 of the irrigation controller 1 to provide a high voltage pulse which is typically used to actuate an irrigation device 22, for example, a solenoid actuated valve actuated by a 10 V pulse. In this embodiment, the boost module 6 comprises a switching regulator U5 which can be, for example, a low power DC/DC boost converter TPS61041 from Texas Instruments. In other embodiments, other types of regulators can be used.

Because of predicted daily fluctuations in the voltage level of the power storage device 4, the irrigation controller 1 is designed to operate at a range of voltages even if the power system 18 is supplying current at very low voltages (e.g., down to about 2 V or less). To deliver a 10 V pulse to an irrigation device 22 from a 2 V supply, the boost module 6 increases the voltage from 2 V to 10 V and stores electrical energy at the increased voltage level. In this embodiment, the switching regulator U5 switches on/off around inductor L4 with a frequency up to 1 MHz. Voltage builds in the inductor L4 and, when switched, current flows through diode D2. The diode D2 prevents current from flowing backwards. This process, when done rapidly, boosts voltage up. Voltage levels sampled from the feedback resistors R11 and R12 provide an indication of the boosted voltage level to the switching regulator U5, allowing the switching regulator U5 to keep the right balance of switches and to keep the voltage steady. A signal for a line (indicated by OUTPUT_V) is also fed into the computer 12 and provides an indication of the boosted voltage. The computer 12 can enable the boost converter until the desired voltage level is achieved. The computer 12 can also log if an error occurred, or if the boosted voltage does not reach the desired level. Two 1200 µF capacitors C37 & C38 store electrical energy at the boosted voltage (e.g., 10 V), and provide energy to the irrigation device 22 through the output module 14. To conserve energy, the 9V_EN line can disable the switching regulator U5 so that it draws virtually no current. The PNP transistor Q15 disables the load from the regulator U5, so the load (C37, C38, & feedback resistors) does not draw any current from the power system 18 when the regulator U5 is disabled. The configuration of the circuitry around Q14 & Q13 operates as a current limiter and provides protection in case a short occur, for example, the embodiment shown limits current up to 2 A.

Figure 6A:
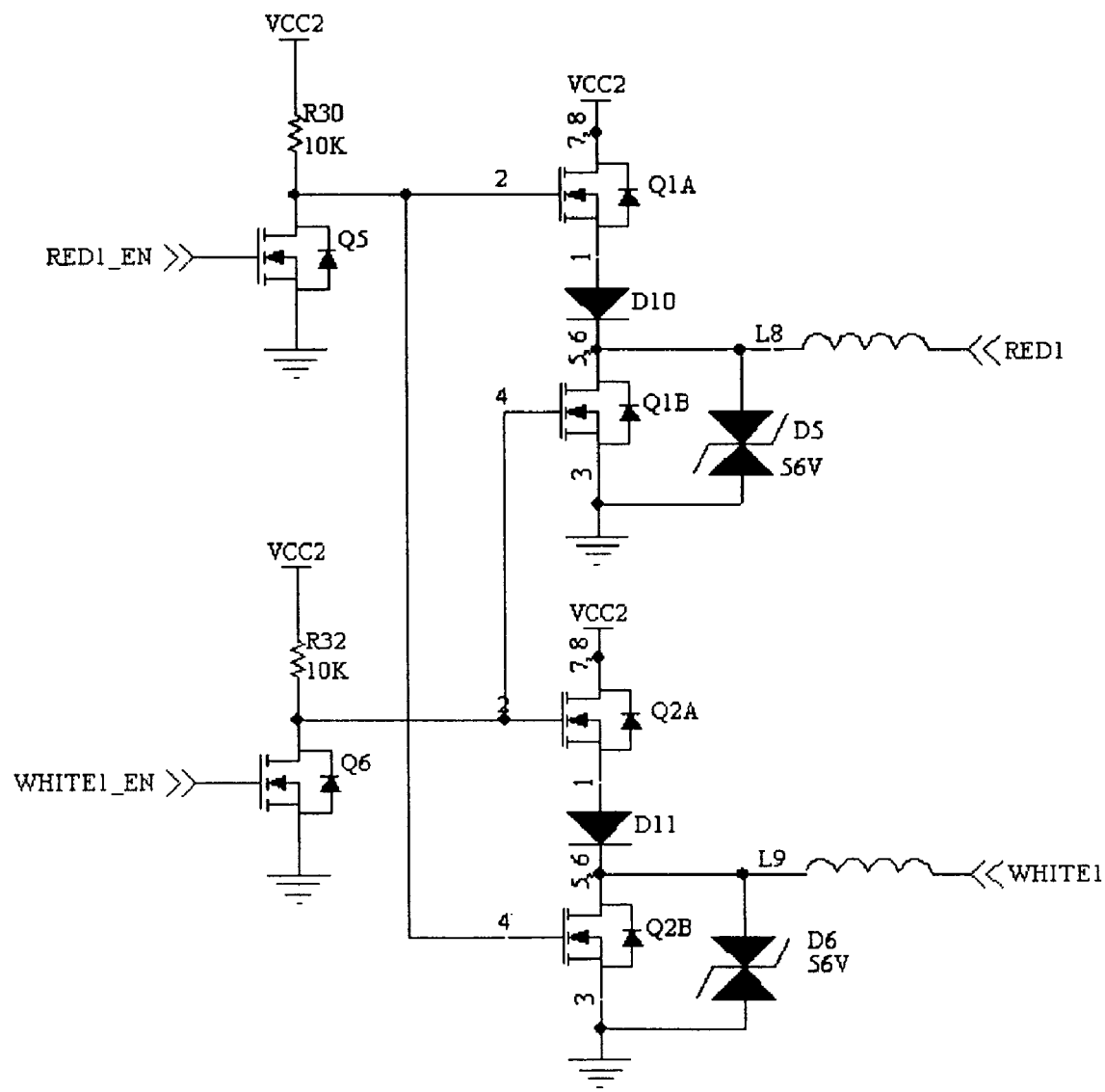
FIGS. 6A-C are schematics of an example of a solenoid control circuit for an irrigation controller.
Figure 6B:
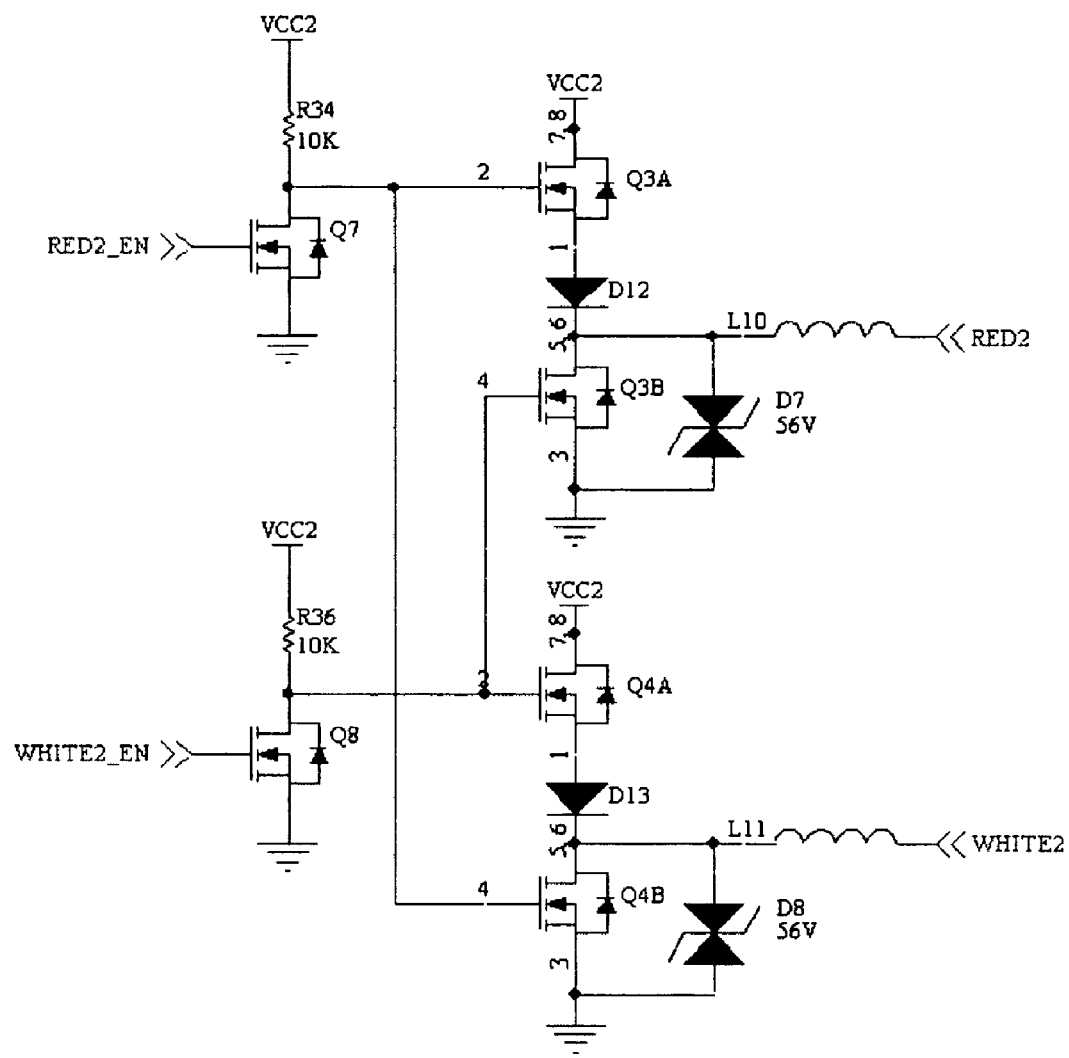
Figure 6C:
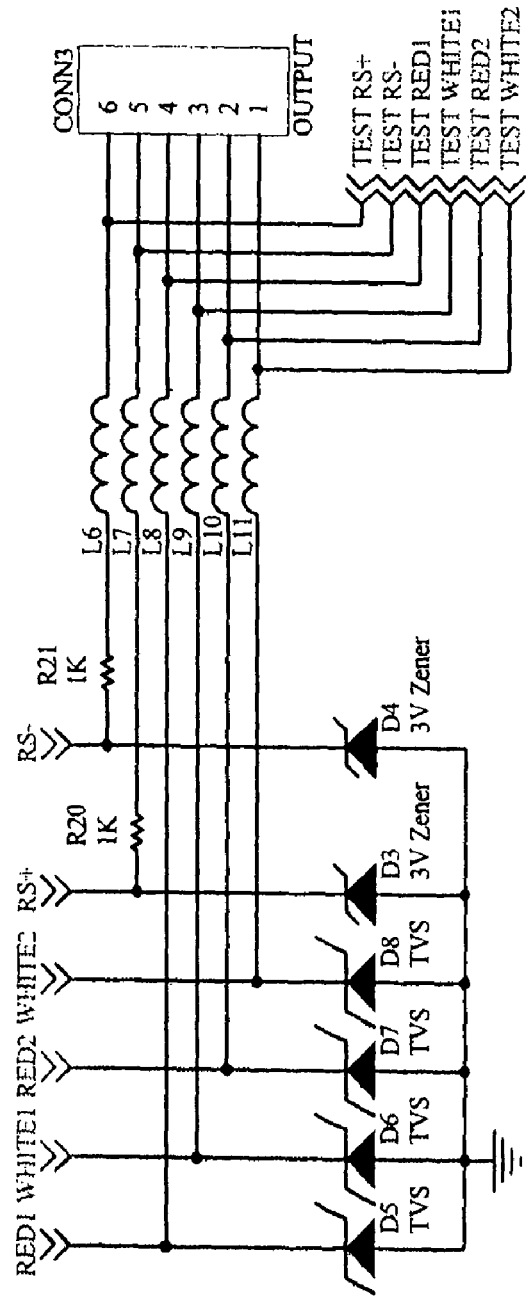

FIGS. 6A-6C are examples of schematics of a solenoid control circuit of the output module 14 for irrigation controller 1 shown in FIG. 1, according to some embodiments. In this example, the irrigation controller 1 is configured to control two irrigation devices 22, which are solenoid actuated valves. The irrigation controller 1 comprises a control circuit with similar configurations for each of the two valves, illustrated in FIGS. 6A and 6B, and described below in reference to FIG. 6A. FIG. 6C illustrates an example of circuitry connecting the computer 12 and the control circuits show in FIGS. 6A and 6B. In this embodiment, the solenoid in the solenoid actuated valve is actuated by a 10V discharge of a 2400 µF capacitor, which can comprise the two 1200 µF capacitors of the boost module shown in FIG. 5. As described above, these capacitors are charged at 10 V using energy provided by the capacitive module 24. At a desired time, the computer 12 provides a signal to the output module 14, which provides a connection to discharge the 10 V capacitors to solenoid, opening or closing the valve.

The output module has two lines to each solenoid actuated valve. To open a valve, one line is pulled to ground. The other line gets a pulse from the capacitor. To close a valve, the polarity is reversed. The 10V line needs to be triggered by a 2.5V (or lower) voltage. Some extra circuitry is required to enable a 10V switch from a 2.5V signal. Q5 pulls Q1A and Q2B high, enabling current to flow. The voltage from the capacitors flows out along the RED1 line. Q2B pulls the white wire to ground. This method of pulling one line high, and the other line to ground will cause the solenoid to actuate open. The polarity is reversed to close the solenoid. These circuits also protect the internal circuitry from voltages applied to the RED/WHITE lines. When the connected irrigation devices are not being actuated, Q1A and Q1B are not conducting. If external voltage is applied to these lines, it should do no damage, since no current will be conducted. The amount of voltage is limited by the specific transistors characteristics. This design helps to prevent damage to the electrical components as up to 60V can be applied to the lines without a high risk of damage. Only when a valve is being actuated is there risk. In that case, Q1B will conduct to ground. If the power (e.g., voltage*current) is greater than it allows for a 20 msec pulse, the damage can occur.

There is further protection from transient voltage surges as illustrated in FIG. 6C. A ferrite bead is in line with the output. If a large voltage surges (such as a near by lightning strike) flows down the line, the impedance of the inductor increases, acting similar to a resistor. The TVS (transient voltage suppressor) will pull the voltage on the line down to a safe value.

Figure 7:
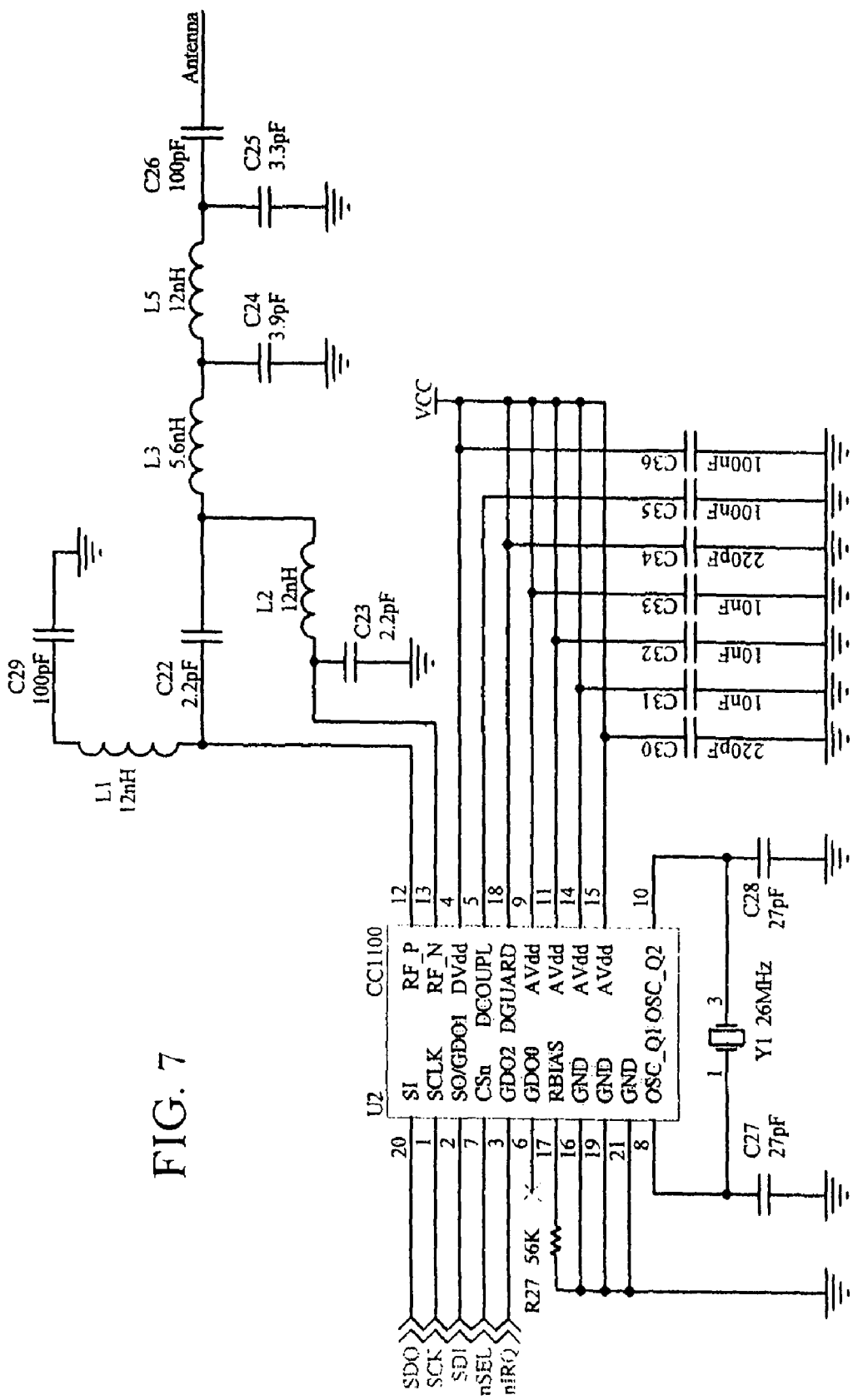
FIG. 7 is a schematic of a communication module.

FIG. 7 is a schematic illustrating an example of a communication module 10 for the irrigation controller 1 of FIG. 1. The communication module can comprise a receiver, a transmitter, or a transceiver. The receiver, transmitter or transceiver can be for radio frequencies or another type of wireless or wired communication means such as infrared beams. The communication module 10 is configured to communicate information between the irrigation controller 1 and another device, for example, handset 3, or directly from a user. In particular, the communication module 10 can be configured to receive operational signals from a user or a transmitting device that comprise information that is used to operate the irrigation controller 1. The communication module 10 can be configured to receive information from the computer 12 and transmit the received information, and/or the communication module 10 can be configured to receive information from another device or user and provide such information to the computer 12. FIG. 7 illustrates one embodiment of a communication module 10 that includes a transceiver U2 CC1100 configured to receive one or more operational signals and provide the signal(s) to the computer 12 for use in operating the irrigation controller 1. The transceiver can also be configured to transmit a signal to indicate receipt of an operational signal, or to transmit a signal for another purpose. For example, in some embodiments the transceiver can transmit a signal indicative of a condition of the irrigation controller, or information relating to an event that occurred in the irrigation controller (for example, a diagnostic condition). Various low power transceivers can be used. In some embodiments, such as illustrated in FIG. 7, the transceiver is an ultra low power UHF wireless transceiver, for example, the SmartRf® CC1100 single chip low cost low power RF-transceiver from Chipcon.

Although the communication module 10 is typically configured with a transceiver, in some embodiments the communication module 10 includes an interface comprising one or more controls configured to accept operational signals from an operator or user, for example, a mouse, buttons, keys, a touchpad, a keyboard or keypad comprising letters, numbers, and or symbols, switches or other input device, and also includes a display (comprising, e.g., a LCD LED's, or other relatively low-energy display device including an analog display device) configured to show information related to the operational signals. In some embodiments, the communication module 10 comprises a device configured to receive a detachable control device (for example, a keypad) that can be attached to the irrigation controller and used to input information.

Figure 8:
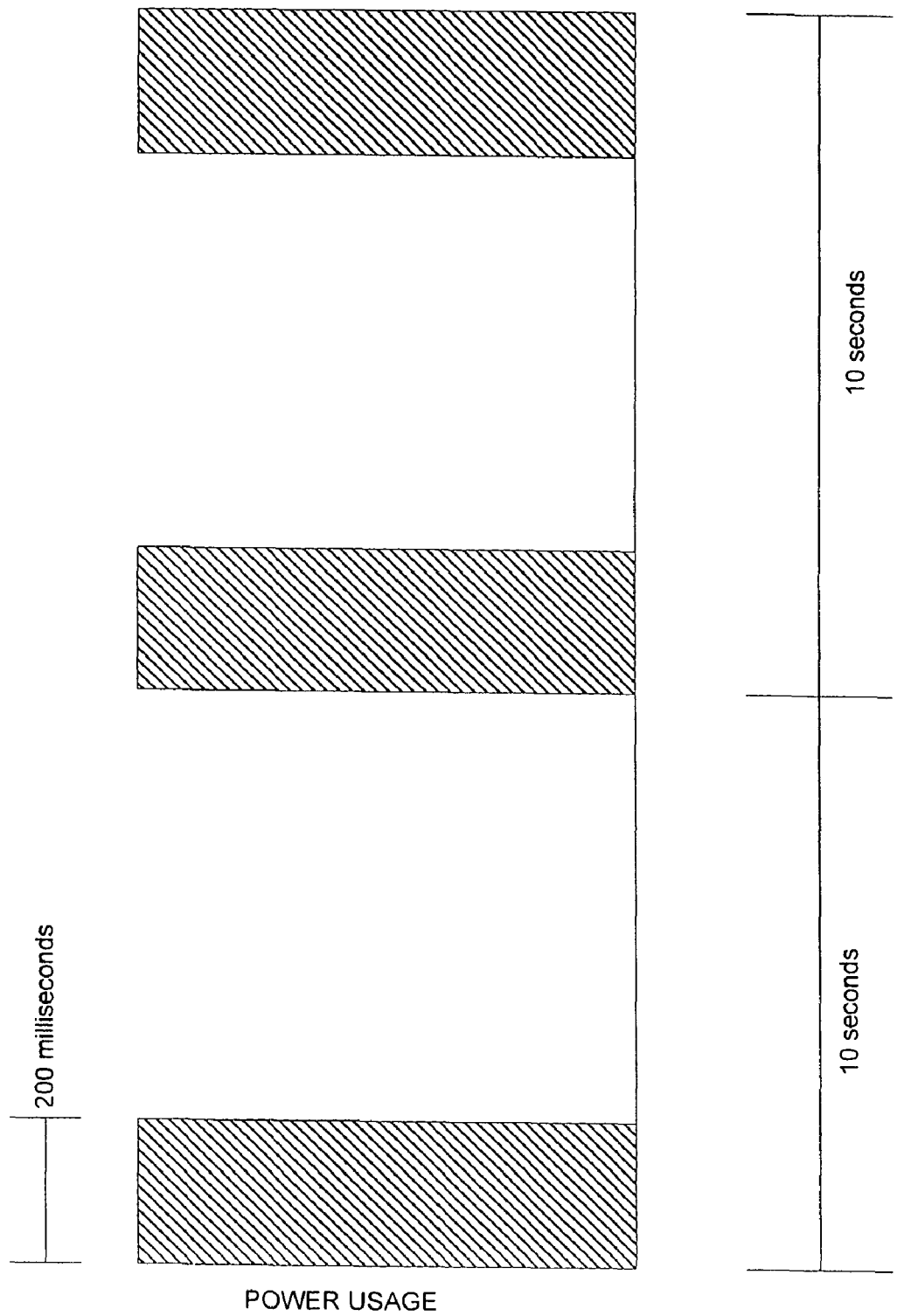
FIG. 8 is a graph illustrating a timing sequence for controlling a communication module.

While this description is generally directed to an embodiment of a communication module that comprises a radio transceiver, it is not limited to radio transceiver embodiments. Instead, the description also relates to other embodiments incorporating other communication means for a communication module. During receive and transmission operations, the transceiver typically consumes the most power of any component in the irrigation controller 1. For example, when the transceiver is not activated, the irrigation controller 1 shown in FIG. 1 can run at about 4-5 µA. However, when in receive mode, the transceiver itself consumes about 15 mA, approximately 3000 times more power than used by the irrigation controller 1 when the transceiver is not activated. To reduce power consumption, a low duty cycle is used to modulate the transceiver "up" time. For example, the transceiver can be configured to be generally be in an inactive state and "wake up" to an active state once every 10 seconds, for a duration of about 200 msec, to determine if there is a message to be received. FIG. 8 graphically depicts such a timing configuration. Having an intermittent active state reduces the transceiver power consumption to about 300 µA. If a message is received, the transceiver can be configured to have a "listen" interval of about 2 seconds. After a period of time when no further messages have been received, the transceiver can again be set to be inactive and "wake up" periodically (e.g., every 10 seconds). The time of inactivity can be predetermined, or it can be dynamically determined based on, for example, the probability of receiving a signal. In some embodiments, a signal received from the computer 12 controls the awake or sleep state of the transceiver. In some embodiments, the transceiver can be set to wake up during a specific portion of a day, and operational information will be transmitted to the transceiver during that time. For example, in some other embodiments the transceiver is configured to be available during daylight hours or a portion thereof (e.g., 8 a.m.-5 p.m.). Such a configuration limits the power consumption of the transceiver to hours when light is most likely present.

In some embodiments, the computer 12 sends a signal to the transceiver to change its state from inactive to active. In other embodiments, the transceiver can control its own "wake up" cycle. Some transceivers, for example, the SmartRf® CC1100 transceiver illustrated in FIG. 7, comprises a WOR (wake on radio) feature. The transceiver chip can be programmed to a low power polling state so that the transceiver can wake up periodically on a set time interval. Once awake, it listens for in incoming signal for a programmed length of time, then returns to a sleep state. This is all done without receiving a signal from the computer 12. In such embodiments, the computer 12 can have its own sleep cycle without affecting the transceiver sleep cycle or the RF functions. If the transceiver does receive a signal, it will trigger an interrupt on the computer 12. This interrupt will wake up the computer 12 and it can operate on the information contained in the signal. In some embodiments, the transceiver chip also offers CRC calculation and checking, which relieves the computer from performing this task which saves more power.

Figure 9:
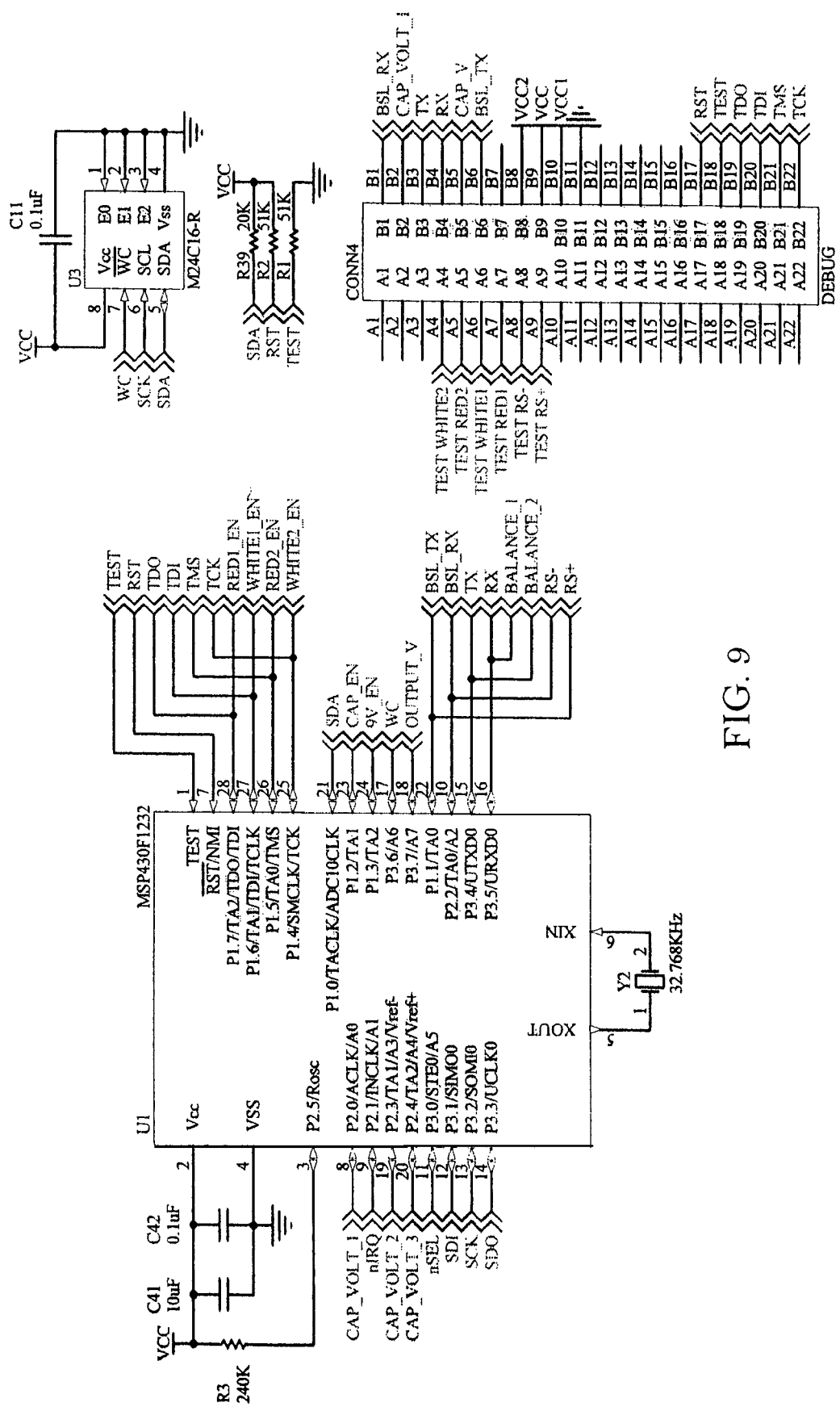
FIG. 9 is a schematic illustrating one example of a computer (e.g., a microcontroller) for an irrigation controller.

FIG. 9 is a schematic of one example an embodiment of the computer 12 for the control system 20 illustrated in FIG. 1, where the computer 12 comprises a microcontroller. In this embodiment, the microcontroller comprises a Texas Instruments ultralow-power MSP430F1232 microcontroller. The computer 12 is the "brain" of the control system 20. The computer 12 can be configured to monitor and control the other components of the irrigation controller 1. For example, the computer 12 can be configured to monitor the voltage of the power system 19. In particular, the computer 12 can monitor the voltage levels of the one or more capacitor(s) in the capacitive module 24 and provide a signal to balance the voltages across each capacitor and prevent the capacitors from over charging. Also, the computer 12 can be configured to monitor the voltage available from the power system 18 and operate the irrigation controller depending on the available power. For example, based on the amount of power available, the computer 12 can be programmed to adjust the activation state of the communication module 10 and adjust its timing parameters for receiving and sending signals, adjust timing of performing irrigation operations, conduct internal checks (e.g., diagnostics), and put the control system 20 in an inactive or sleep state. The computer 12 is also configured to control sending and receiving operational signals from the communication module 10. The computer 12 can be further configured to run irrigation programs, log history of the irrigation controller operations, generate and provide status information which can be provided (e.g., transmitted or displayed by the communication module, and perform setup and shutdown operations of the irrigation controller 1.

The computer 12 can include a timing component 16, for example a real-time clock. In some embodiments, including the embodiment comprising the MSP430F1232 microcontroller, the microcontroller comprises the timing component. The timing component can be a 32.768 kHz crystal, which provides a timing signal. In other embodiments, the control system 20 includes a timing component 16 that provides a timing signal to the computer 12 but that is not part of the computer 12.

The computer 12 in FIG. 9 also includes an on-chip A/D converter, which is used to monitor the voltage levels of the power system 18. By monitoring the voltage levels, the computer 12 can take the necessary steps to conserve energy, for example, by shutting down the control system 20 until the power system 18 is able to provide a predetermined amount of energy. The computer 12 monitors charging the capacitor(s), which provide the output voltage for actuating the irrigation devices, and verifies that the capacitor(s) reach the necessary voltage, or otherwise record an error.

The computer 12 can be initially programmed with a variety of different power saving functionality and operational processes (e.g., an irrigation schedule). During operation, the computer 12 can receive operational signals comprising information that affect its operations. This information can include changing irrigation day/time and irrigation durations (e.g., the time to open and close solenoid actuated valves), or changing programming relating to monitoring voltages and controlling functionality of the irrigation controller 1 based on the monitored voltages.

Figure 10:
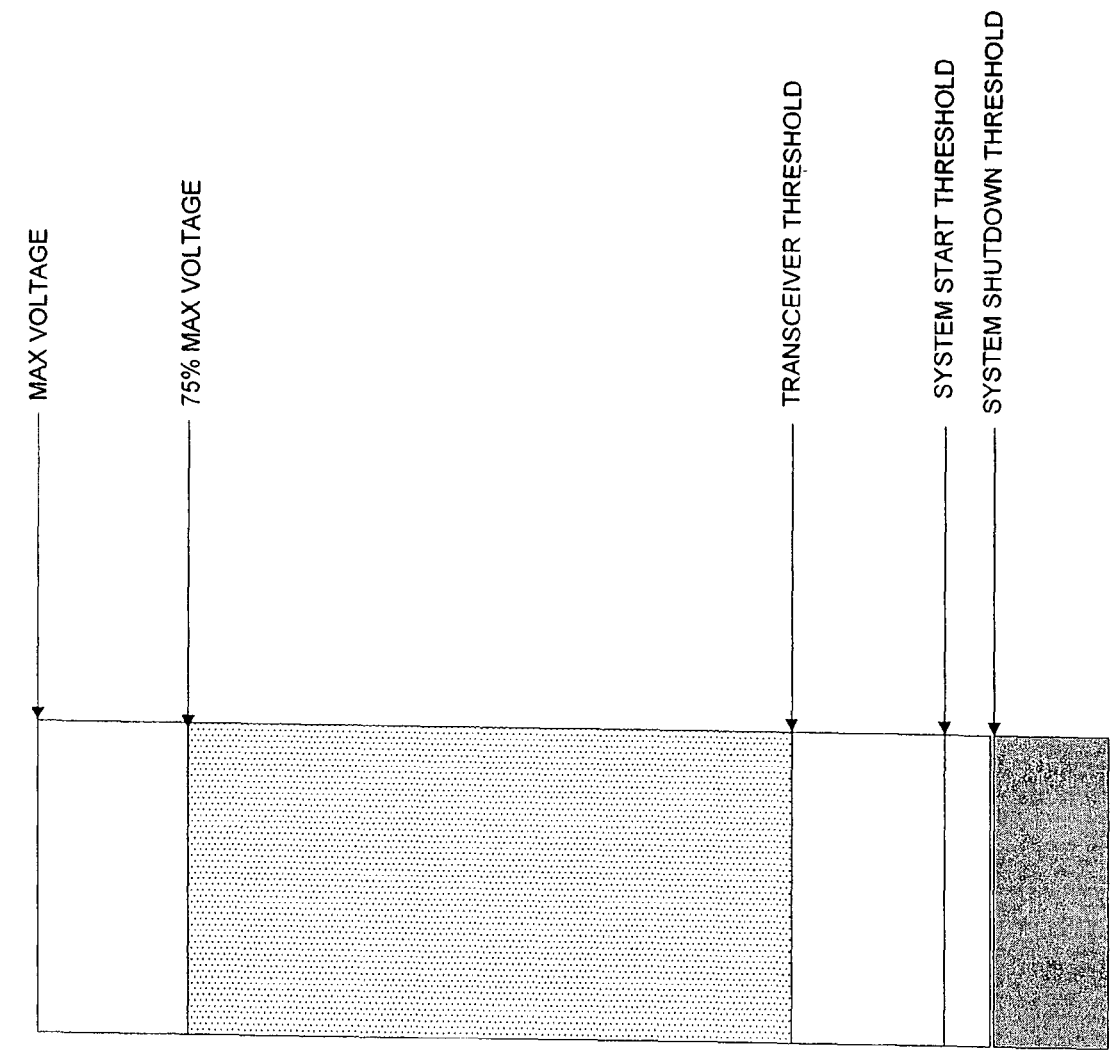
FIG. 10 is a diagram illustrating examples of operational voltage levels for an irrigation controller.

FIG. 10 illustrates examples of voltage levels that relate to power saving operations, e.g., controlling functionality of the irrigation controller based on the monitored voltage level thresholds. For example, one power saving operation relates to a communication module (or transceiver) threshold voltage level, where at or above this voltage level the computer 12 turns the transceiver on so that it can periodically activate as previously described, and below the voltage level the computer 12 turns the transceiver off so that it will not activate until the voltage level rises above this threshold value. In some embodiments, such as the one described herein, the communication module threshold voltage value can be about 4.2 volts or more. In some embodiments, the threshold voltage value can be at the minimum operating voltage level for the communication device (e.g., a transceiver) being used.

Another power saving process relates to a system shutdown threshold. When the voltage level is below the system shutdown threshold the computer 12 may not run properly. When the computer 12 determines that the voltage from the power storage device 4 is at or below the shutdown threshold, the computer 12 turn off all solenoids and safely shuts itself down, putting the control system 20 into a state of very low activity (e.g., a "deep sleep" state). Periodically, the computer 12 wakes up to check the available voltage from the power storage device 4 and determines if the voltage level has attained the system start threshold. Once this voltage level is reached, the computer 12 starts up and the control system 20 can safely come back online.

The microcontroller includes real-time clock ("RTC") functionality. It uses a low power 32.768 kHz (Y2) crystal to keep time. An internal counter is really incremented one every oscillation. This increment is divided by 8, so the counter is actually incremented once every $8^{th}$ oscillation. The timer will overflow at 1 min, creating an interrupt. The timer overflow interrupt service routine is called, and the time is updated.

The microcontroller also controls the output circuitry. The output pulse is a 10V discharge from a capacitor. To charge the capacitor to its voltage level, a boost circuit is used. The microcontroller controls an enable line, enabling the boost, charging the capacitor. Once charged, the boost circuit is disabled, conserving energy. To actuate an irrigation device, the microcontroller sends a signal to open a path between the capacitor and the designated irrigation device, allowing energy from the actuation capacitor to be transferred to open or close the irrigation device.

The computer 12 is designed to run on very low voltage. In some embodiments, the computer 12 will still be functional down to 1.8V. This allows the control system 20 to run from a high of 7.5V (limit of the super capacitors) down to 1.8V (limit of the computer 12). This large operating range allows the irrigation controller 1 to run even in low light conditions.

The irrigation controller 1 configuration enables it to operate in low light. In particular, the hardware and the software configuration of the irrigation controller 1 are specifically designed to operate at extremely low power levels. For example, in the embodiment described herein, during the day (e.g., between 8 a.m. and 5 p.m.) the irrigation controller 1 can operate on an average of less than or equal to about 0.4 mA. Such a configuration enables an irrigation controller to use a small PVM 2 to convert light energy to electrical energy, to store electrical energy in a power storage device 4 comprising capacitors, and to control irrigation using only electrical energy stored in the power storage device 4. No other power source is needed. One aspect of this design is that capacitors have a lower power density than batteries and can be charged very quickly. Using super capacitors in the power storage device 4 allows a relatively large amount of electrical energy to be stored quickly if sufficient light is present.

Figure 16:
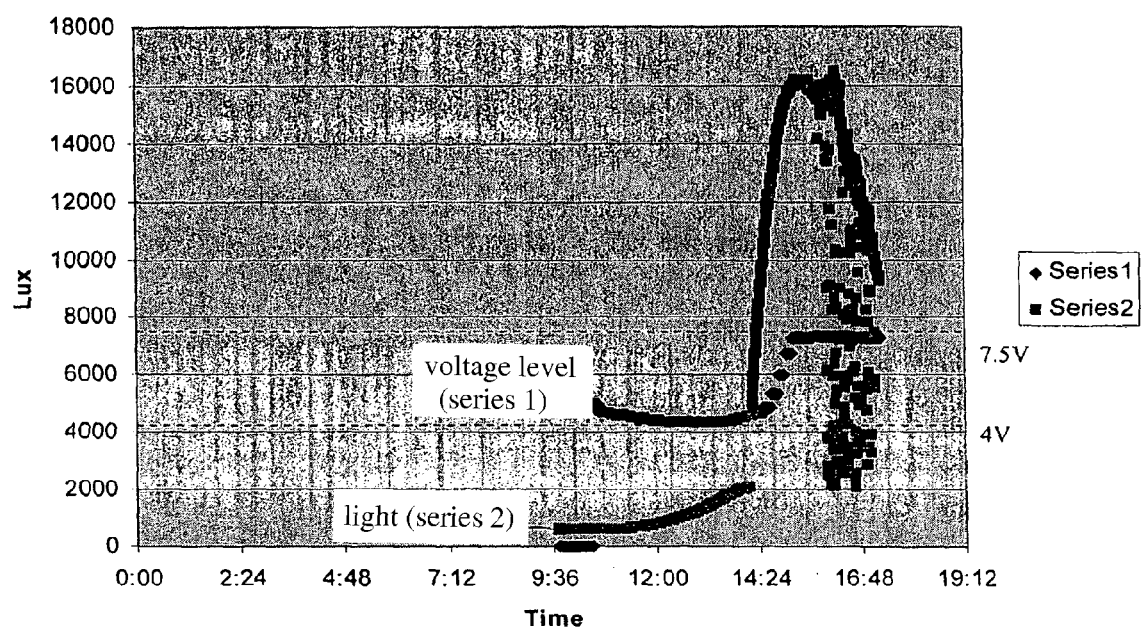
FIG. 16 is a graph illustrating the relationship of incident light and voltage level of a power storage device 4 during a portion of the day.

In the embodiment described herein, the irrigation controller 1 can maintain voltage when the PVM 2 receives at least about 2,000 lux. The power storage device 4 starts charging when the PVM 2 receives at least about 3,000 lux. This allows the irrigation controller 1 can maintain voltage during about 2% of sunlight, and charge the power storage device 4 when the PVM 2 receives at least about 3% of sunlight. For example, the average current draw during the day (8 a.m.-5 p.m.) is about 0.4 mA. At night, the current draw is 4-5 µA, which is negligible. FIG. 16 is a graph illustrating the relationship of incident light and voltage level of a power storage device 4 during a portion of the day. In particular, FIG. 16 shows actual data collected between 9 am and 5 pm for the embodiment of the irrigation controller 1 described herein, where the voltage level of the power storage device 4 is shown by line labeled series 1, and the incident light is illustrated by the line labeled series 2. As can be seen in FIG. 16, the voltage level of the power storage device 4 drops slowly beginning at about 9 a.m. until the incident light is about 2000 lux. Once the light level is above 2000 lux, the power storage device starts to charge until full power (7.5V) is reached at about 2:45 p.m., and maintains this charge level for the remainder of the test period.

Figure 11:
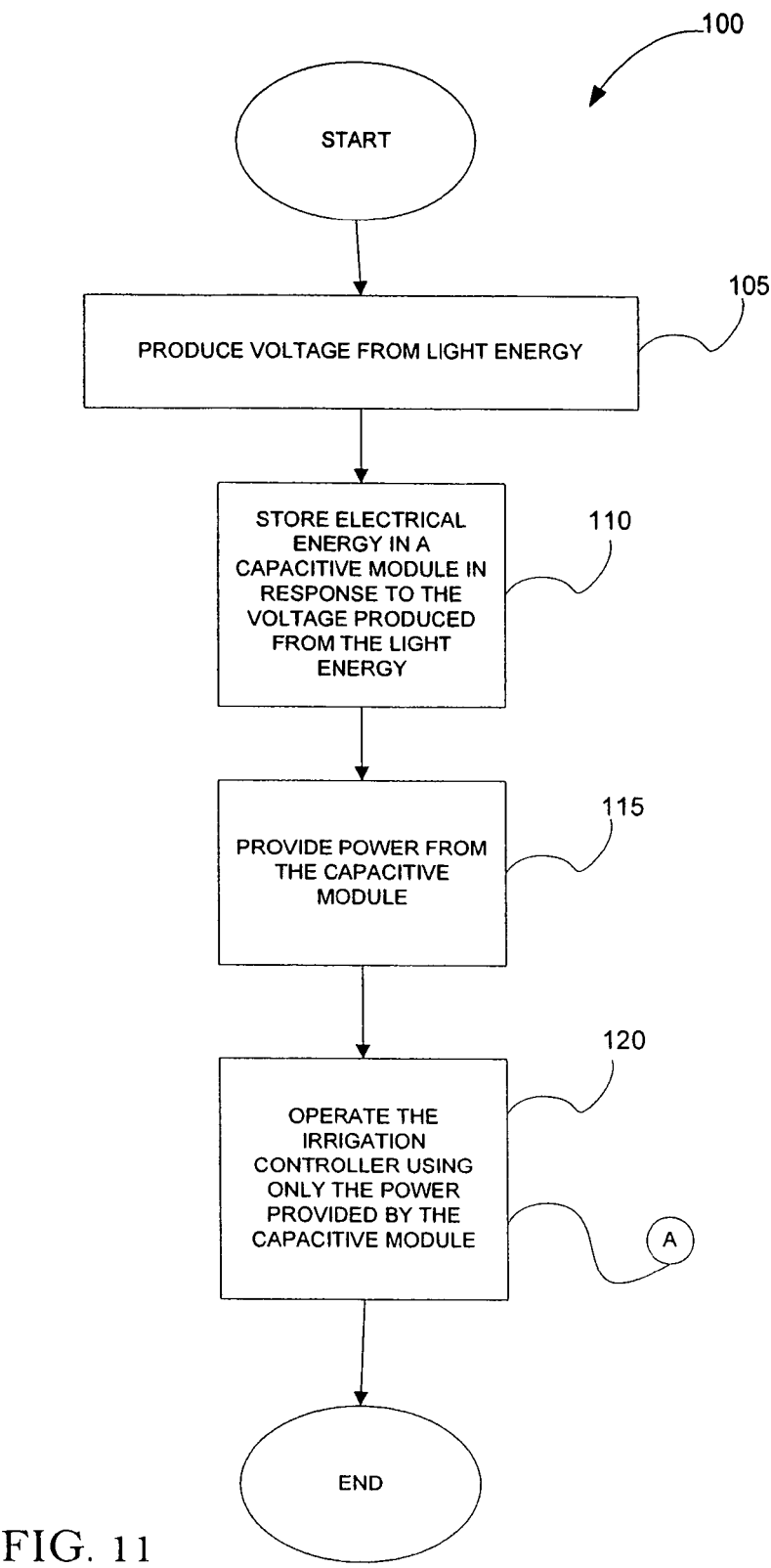
FIG. 11 is a flowchart illustrating a process of operating an irrigation controller.
Figure 12:
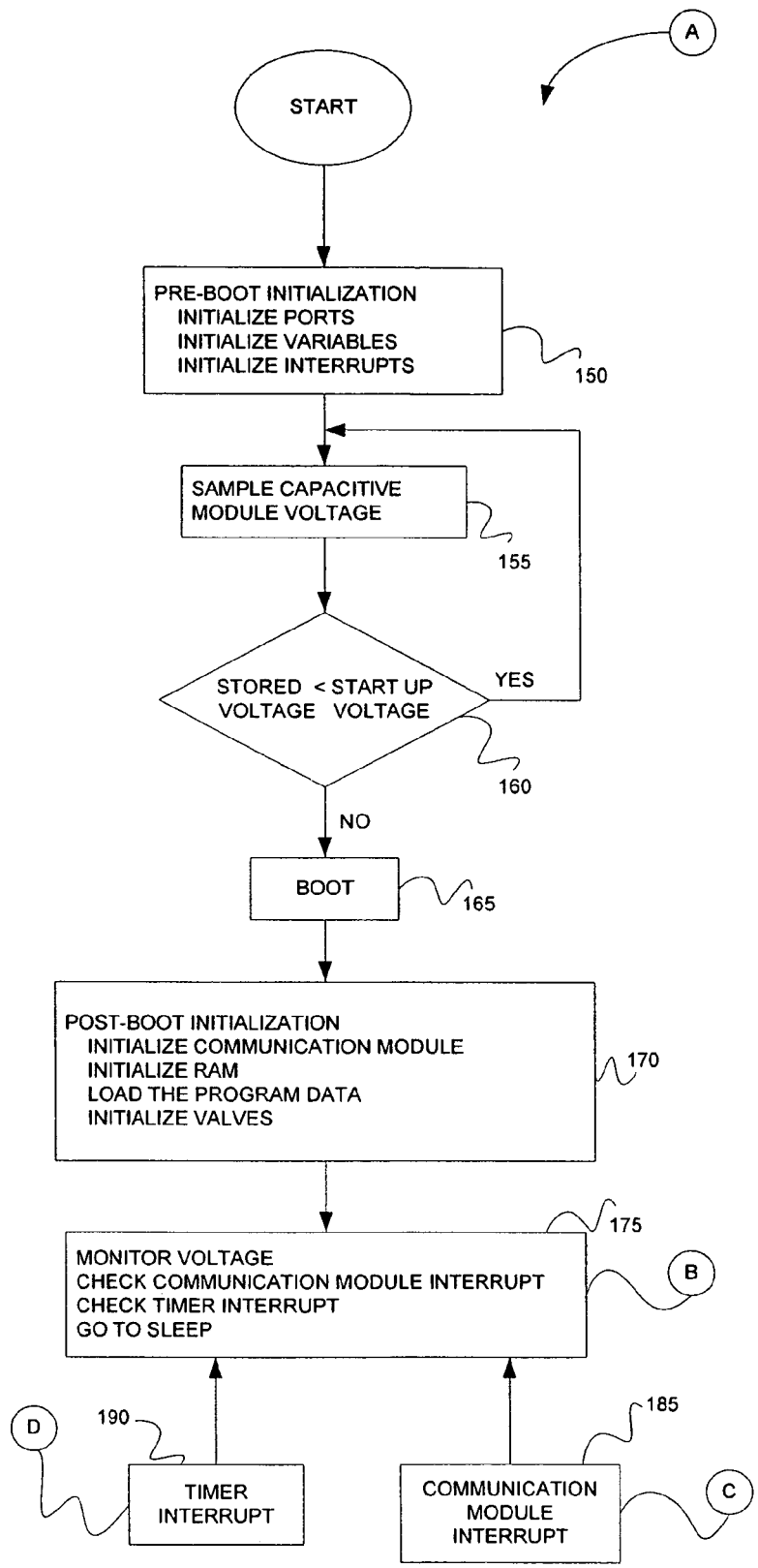
FIG. 12 is a flowchart illustrating a control process of an irrigation controller.
Figure 13:
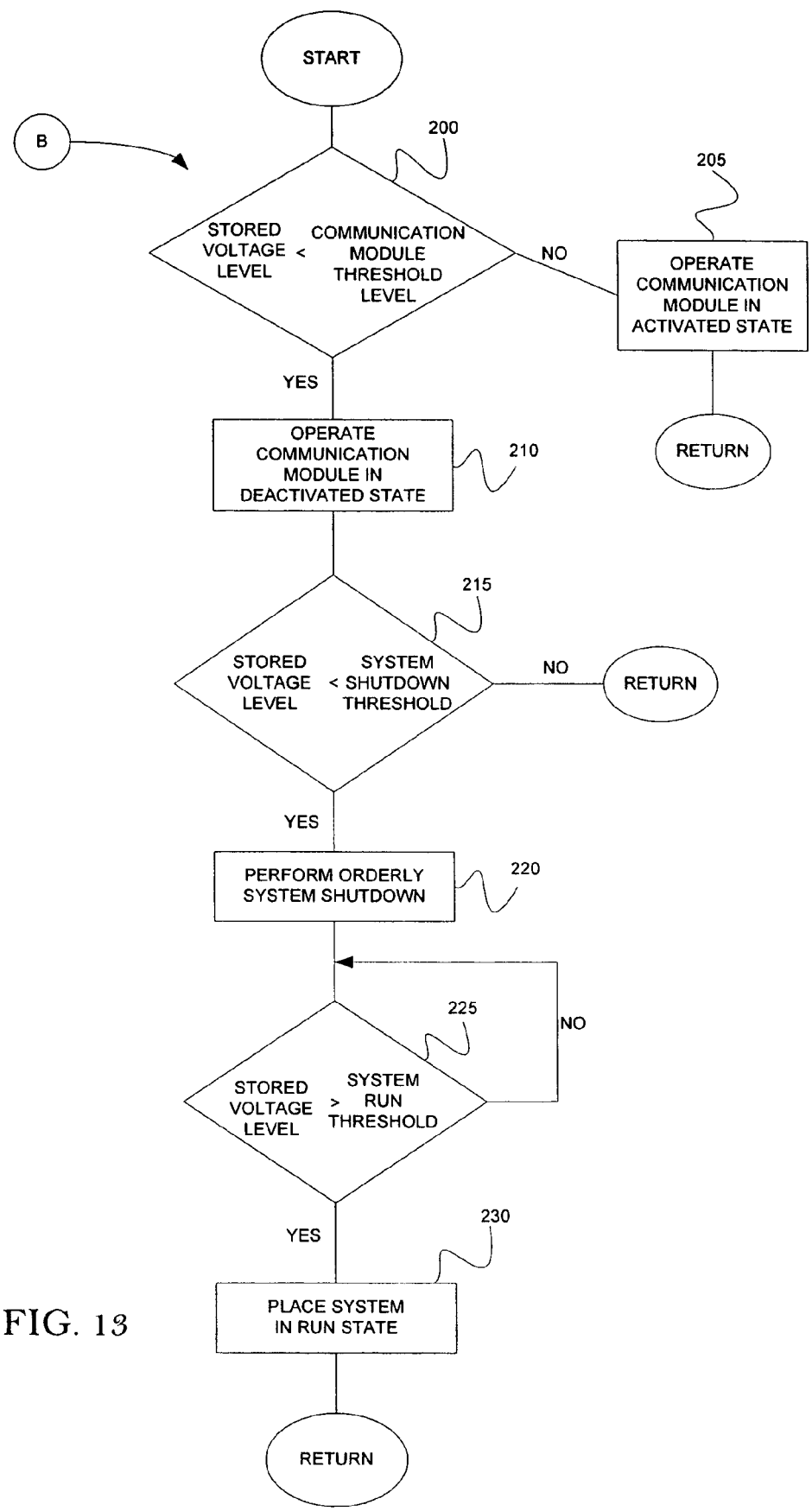
FIG. 13 is a flowchart illustrating a voltage monitoring process of an irrigation controller.
Figure 14:
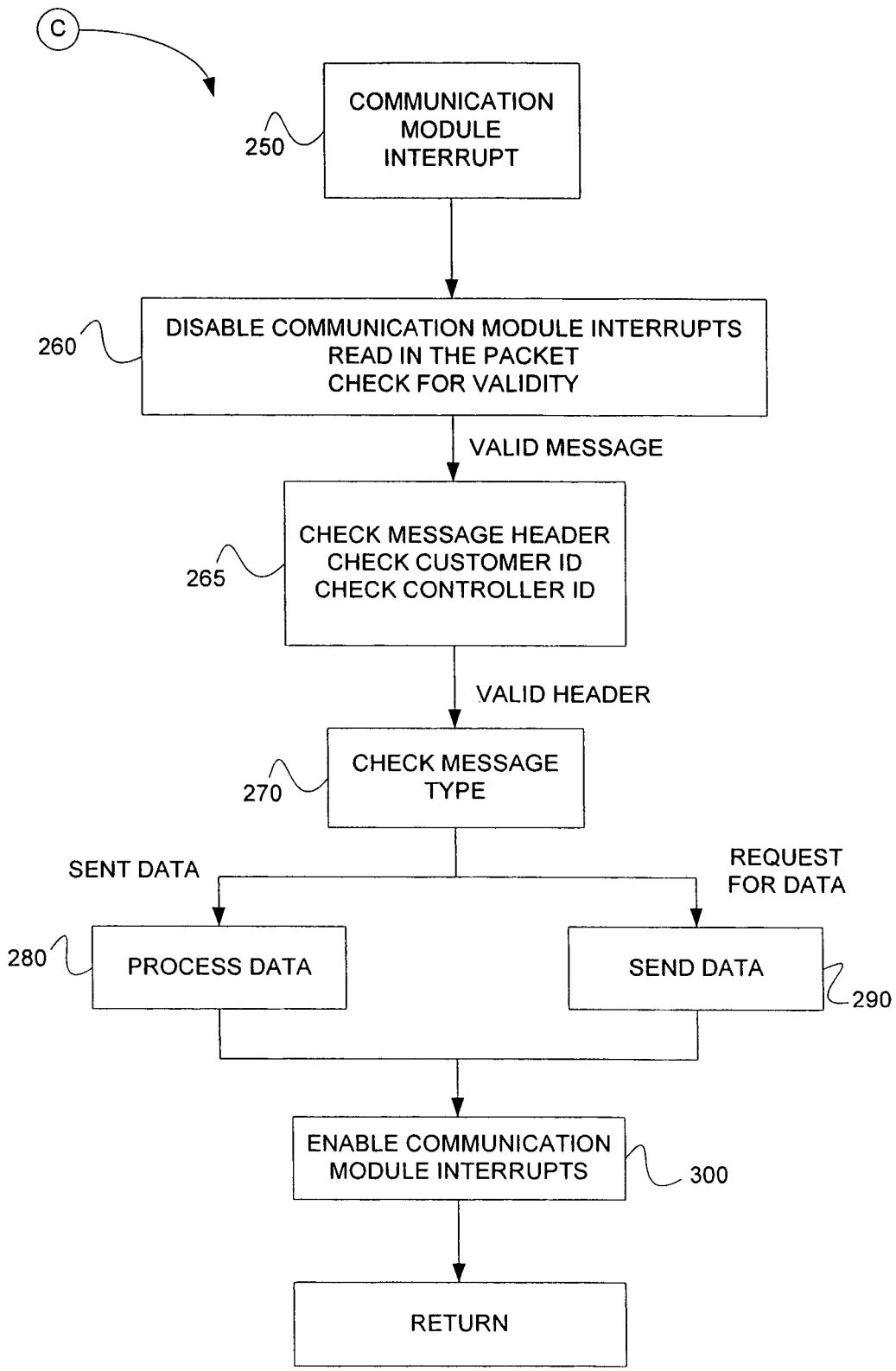
FIG. 14 is a flowchart illustrating a communication module interrupt process of an irrigation controller.

FIG. 11 is a flowchart illustrating a process 100 of operating an irrigation controller 1 (e.g., FIG. 1). FIGS. 12-14 illustrate processes that can operate in conjunction with process 100 and relate to various aspects of the operation of the irrigation controller 1. Examples of the various components and/or modules referred to in describing process 100 are illustrated in irrigation controller 1 shown in FIG. 1, unless otherwise stated. Referring now to FIG. 11, at state 105 process 100 produces voltage from light energy. PVM 2 positioned so that it receives light can be used to produce a voltage from light energy. At state 110, process 100 stores electrical energy in a capacitive module 24 (FIG. 2) in response to the voltage produced from the light energy. The capacitive module 24 can comprise two or more super capacitors configured in series to store the electrical energy. At state 115, process 100 provides stored electrical energy from the capacitive module 24. At state 120, process 100 operates the irrigation controller 1 using the power provided by the capacitive module 24 in the power storage device 4. Specifically, the electrical energy provided by the power storage device 4 is provided to the voltage regulator 8, which in turn supplies regulated power to the communication module 10 which receives operational signals and provides an output, e.g., on a display or in a transmitted signal. The voltage regulator 8 also provides power to the computer 12, which is configured to operate the control system 20 and control one or more irrigation devices 22 using only power provided by the power storage device 4. The power storage device 4 also provides (unregulated) power to the boost module 6 to charge capacitors that actuate the irrigation device 22.

Operation of the irrigation controller 1 is further described in reference to process A, illustrated in FIG. 12. At state 150, process A performs pre-start initializations in preparation for operating the irrigation controller 1, including initializing ports, variables, and interrupts. Such initialization can be performed by the computer 12 and the relevant corresponding components, e.g., the communication module 10. At state 155, the stored voltage level (in the power storage device 4) is sampled, and at state 160, the stored voltage is compared to a predetermined startup voltage. The startup voltage is the minimum voltage level required to operate the computer 12. A low-level process in the computer 12 can perform this voltage sampling and comparison. The process initializes everything it needs, and then performs an A/D conversion until the voltage is high enough to proceed. If the voltage is too low, the system goes to sleep for 1 minute. Once the voltage is high enough, it will continue. An example of code that can perform this process is shown below as further description of this process:

```
void main(void){
    pre_boot_init( );
    wait_for_boot_voltage( );
    post_boot_init( );
    while(TRUE){
        check_rf_interrupt( );
        check_timerA_interrupt( );
        goto_sleep( );
    }
}
void wait_for_boot_voltage(void)
{
    while(1){
        BATT_EN = 1;
        battery_voltage = ADC(SUPER_CAPS);
        BATT_EN = 0;
        if( battery_voltage > BOOT_VOLTAGE)
            break;
        goto_sleep( );
    }
}
```

If the stored voltage level is less than the required startup voltage, process A loops back and continues to periodically sample the voltage stored in the power storage device 4. If the stored voltage is greater than the startup voltage, process A proceeds to state 165 where it performs a startup (boot) operation of the main control program configured on the computer 12. Process A proceeds to state 170 and performs additional start-up tasks and post-boot initializations, which comprise initializing the communication module 10 and memory (e.g., RAM) used by the computer 12, loading program data, and initializing connected irrigation devices 22.

During initialization, events that are programmed to occur at certain time are recognized and corresponding timers are set up for the events. For example, one event may be to activate and deactivate an irrigation device 22 at certain times. The main control loop for process A is illustrated at state 175 and 180. At state 175, process A begins to monitor the voltage level of the power storage device 4 so that appropriate operations can be enabled or disabled based on the voltage level, as described in process B illustrated in FIG. 13. At state 180, process A checks to see if an interrupt has occurred, and if so process A performs an appropriate action. The interrupts can be, for example, a communication module interrupt (state 185) or a timer interrupt (state 190). Process C (FIG. 14) illustrates an example of a process performed in response to receiving the communication module interrupt. Process D (FIG. 15) illustrates an example of a process performed in response to receiving the timer interrupt. If not interrupts are received, process A goes to "sleep" for a certain amount of time, and then "awakes" and again monitors the voltage level(s) and checks for interrupts. The amount of "sleep" time can be set to be periodic for a predetermined amount of time, or it can be dynamically set based on, for example, the volume of operational signals being received or sent, the time of day, the date, diagnostic conditions of the irrigation controller, or other conditions present in the irrigation controller 1. Process A can continue to run for many years until the monitored voltage drops below a threshold value, or an operational signal is received indicating that the irrigation controller should be shut down.

FIG. 13 is a flowchart illustrating an example of a energy monitoring and control process B of an irrigation controller, which monitors the energy available in a storage device and activates or deactivates various components based on the amount of available energy. In particular, process B monitors the voltage level of the power storage device 4. Because the communication module 10 typically requires the largest amount of power, it is the first component to be deactivated if conservation is required. At state 200, process B compares the stored voltage level to a communication module threshold. If the stored voltage level is greater, in state 205 process B continues to operate the communication module 10 and process B returns to state 175 of process A (FIG. 12) where it continues to monitor the voltage periodically. If the stored voltage level is less, then in state 210 process B operates the communication module in a deactivated state. Process B proceeds to state 215 where it compares the stored voltage level to a system shutdown voltage threshold. If the stored voltage level is greater, process B continues to operate the irrigation controller 1 in an operational mode and returns to state 175 of process A where it continues to monitor the voltage periodically. If the stored voltage is less, at state 220 process B performs an orderly shutdown of the control system 20 to prevent a "crash" that can occur when the provided voltage falls below the level required to operate the computer 12. Process B continues with the control system 20 shutdown, however, the computer 20 is in a state 225 where it can still monitor the stored voltage level. When the stored voltage is greater than the system run voltage threshold, process B places the control system in run state, returning to state 150 of process a where it begins a boot-up process.

The computer 12 can maintain a "wait" or "sleep" state where it awaits an interrupt to respond to, which corresponds to state 180 in process A (FIG. 12). FIG. 14 is a flowchart illustrating a communication module interrupt process C occurring at state 185, which corresponds to state 185 of process A. A communication module interrupt indicates that the communication module 10 has received a signal (message) that requires processing. The signal can be information related to the communication module 10 itself, for example, indicating a diagnostic condition has occurred in the communication module 10, the computer 12, or in another component of the irrigation controller 1, or it can be operational information received from a user input attached to the irrigation controller (e.g., via a keypad) or a communication device (e.g., a wireless transceiver). At state 260, process C responds to the interrupt by disabling further communication module interrupts, reading in the information, and begins to process the information to check validity.

Various types of signal formats can be used to communicate data to and from the irrigation controller 1. In some embodiments and as described herein, the signal includes a header and data, where the data includes operational information that either requests information from the irrigation controller 1 or is to be used by the irrigation controller 1, for example, to operate the irrigation devices. At state 265, process C validates header information, checking for a valid customer ID and a valid controller ID. The controller ID is the ID of the irrigation controller. In one embodiment, a handset will communicate with up to 99 controllers. The customer ID is a unique ID for a group of 99 irrigation controllers. It allows multiple groups of up to 99 controllers to operate in the same area. For example, if customer A bought 5 controllers and customer B bought 5 controllers, they would have unique customer IDs (e.g. AAA and BBB). Both customers can now have the same controller ID's (e.g. 01, 02, 03, 04, 05). Customer A would be able to connect to his controller ID: 01 without interfering with customer B's controller ID: 01.

At state 270, process C determines the type of signal received. If the signal comprises operational information for operating the irrigation controller, at state 280 process C processes the operational information and uses the information to operate the irrigation controller 1. The computer 12 can process the operational information and store information received in the signal in memory. Some examples of such operational information can include:

```
GET_PROGRAM_A - get program A's data (days, start times, duration)
GET_PROGRAM_B - get program B's data (days, start times, duration)
GET_TIME - get the time
GET_EVENTS - get events off data
GET_RAINOFF - get rain off data
GET_MONTH_OFF - get month off data
GET_BUDGET - get the budget
GET_MAN_TEMP - get time remaining in a manual temp run
GET_CONTROLLER_ID - get the controller info
GET_CURRENT_STATUS - get current status values (errors, temperature, power, etc)
GET_PROGRAM_STATUS - get any program info that has been modified
GET_VALVE_STATUS - get the status of each valve
GET_HISTORY - get the history (how long each valve has been on)
GET_ALERT - get error messages (open circuit, short circuit)
SET_PROGRAM_A - set program A's data (days, start times, duration)
SET_PROGRAM_B - set program B's data (days, start times, duration)
SET_TIME - set the time
SET_EVENTS - set events off data
SET_RAINOFF - set rain off data
SET_MONTH_OFF - set month off data
SET_BUDGET - set the budget
SET_MAN_TEMP - set the manual temp run time
SET_CONTROLLER_SETUP - set controller data (ID's)
OPEN_V1 - open valve 1
CLOSE_V1 - close valve 1
OPEN_V2 - open valve 2
CLOSE_V2 - close valve 2
```

If the signal comprises a request for data, at state 290 process C processes and responds to the data request. The computer 12 can process the data request signal, and provide the requested data via the communication module 10. In embodiments where the communication module 10 comprises a display, the data is provided on the display. Typically, the communication module 10 comprises a wired or wireless transceiver in communication with a user operated transceiver (e.g., a mobile handset or a base station), and in such embodiments the requested data is provided to the user operated transceiver for display and/or processing.

After the received signal is acted on, at state 300 process C enables interrupts from the communication module 10 to occur, and then returns to process A which continues to monitor for additional interrupts.

Figure 15:
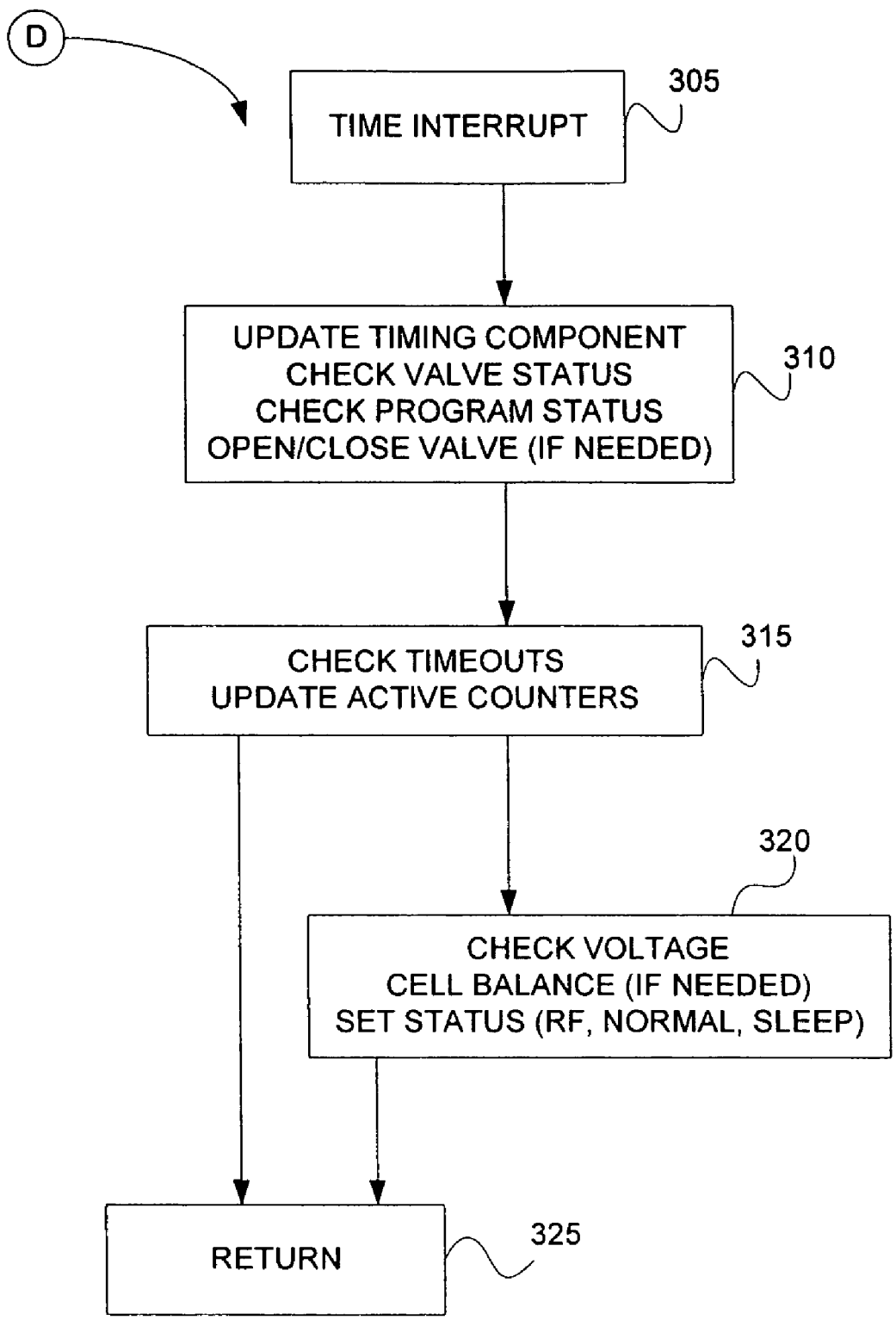
FIG. 15 is a flowchart illustrating a timer interrupt of an irrigation controller.

The computer 12 can maintain a "wait" or "sleep" state, corresponding to state 180 in process A (FIG. 12), where it also awaits a timer interrupt. FIG. 15 is a flowchart illustrating an irrigation controller timer interrupt process D that starts when a timer interrupt occurs at state 190 (which corresponds to state 190 of process A). Process D is typically embodied in the computer 12. A timer interrupt awakens the computer 12 periodically. The period of the timer interrupt can be predetermined or dynamically determined, for example, by the activity level of the control system 20. In some embodiments, the timer interrupt period can be depend on the time of day or season so that the period is longer during night time or during a portion of a season when it is less likely the irrigation controller needs to perform an action. Typically, the timer interrupt period can be programmed through information received by the computer 12 via the communication module 10.

When a timer interrupt occurs, at state 310 process D updates the timing component to determine the actual time, and checks the program for actions that are scheduled to be performed or actions that need to be performed based on some event. Such actions can include checking the status of irrigation devices (e.g., checking valve status), beginning or ending an irrigation event (e.g., opening or closing a valve), checking status of the irrigation controller components, updating other timing processes or devices of the irrigation controller 1 including counters, timers, or clocks, checking voltage level of the power storage device 4, determining if cell balancing is required, checking actions related to the communication module 10 (e.g., checking communication timeouts), running diagnostics, determining interrupts, and updating a timing module (e.g., a real-time clock). For example, in some embodiments a process such as described in the example of code below addresses some of such actions:

```
void check_timerA_interrupt(void)
{
    if(timerA_interrupt){
        update_rtc( );
        check_cell_balance( );
        check_system_voltage( );
        check_valve_status( );
        check_rf_timeout( );
        timerA_interrupt = 0;
    }
}
```

}
where
    update_rtc( ) updates the time, date;
    check_cell_balance( ) checks if the cells are out of balance and takes necessary action
    (i.e., balances the cells);
    check_system_voltage( ) checks the power threshold and takes necessary action (i.e.
    turn on/off radio, go to sleep, etc.);
    check_valve_status( ) checks the valves status, and takes the necessary action (i.e.
    opens/closes the valve, logs errors, logs time it has been open, etc.); and
    check_rf_timeout( ) check if there has been RF activity in the last 3 minutes, and if
    not, it resets the RF polling interval to 10 seconds (from 2 seconds).

At state 315, process D checks for timeouts that may have occurred in processes since the last time this process was run. In some embodiments, one or more counters are used to set intervals for checking functionality. Examples of counters that can be set include, but are not limited to, a RF polling timeout (after 3 minutes of RF inactivity, poll interval changes), Rain Delay counter (prevent the valves from operating for XX days), Operate Every XX days counter (e.g., open the valve every 05 days), Valve Open counter for how long a valve has been open (e.g., in minutes per month), valve run counter for how long a valve will run for, and Manual Run counter (temporally run for XX minutes). Such counters are associated with timeouts. If the counter counts down to zero, it has timed out, and the necessary action taken. If there are no scheduled actions to be performed, at state 325 process D returns to process A (FIG. 12) where it awaits another interrupt. When so indicated by the program status, at state 320 process D checks the voltage level of the power storage device 4, performs cell balancing if needed, and sets the state of the control system 20 based on the voltage level. The voltage check can be done in accordance with process B illustrated in FIG. 13.

Figure 17:
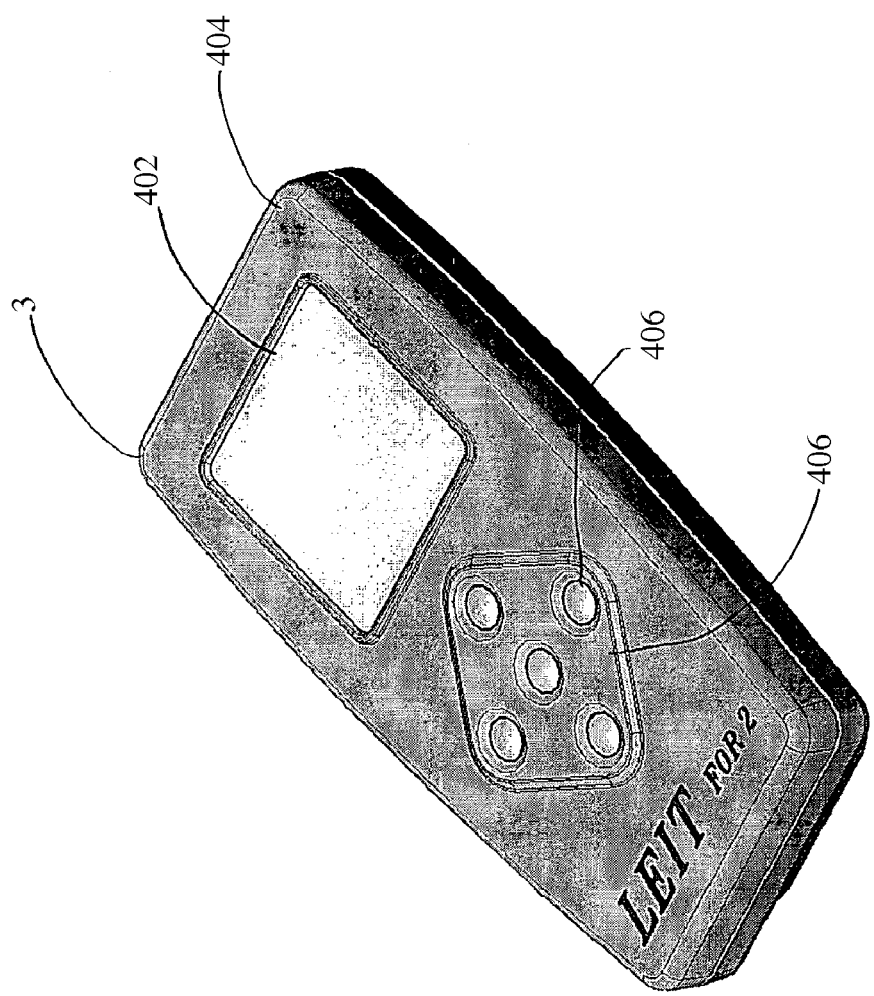
FIG. 17 is a perspective diagram illustrating a handset used to control an irrigation controller.
Figure 18:
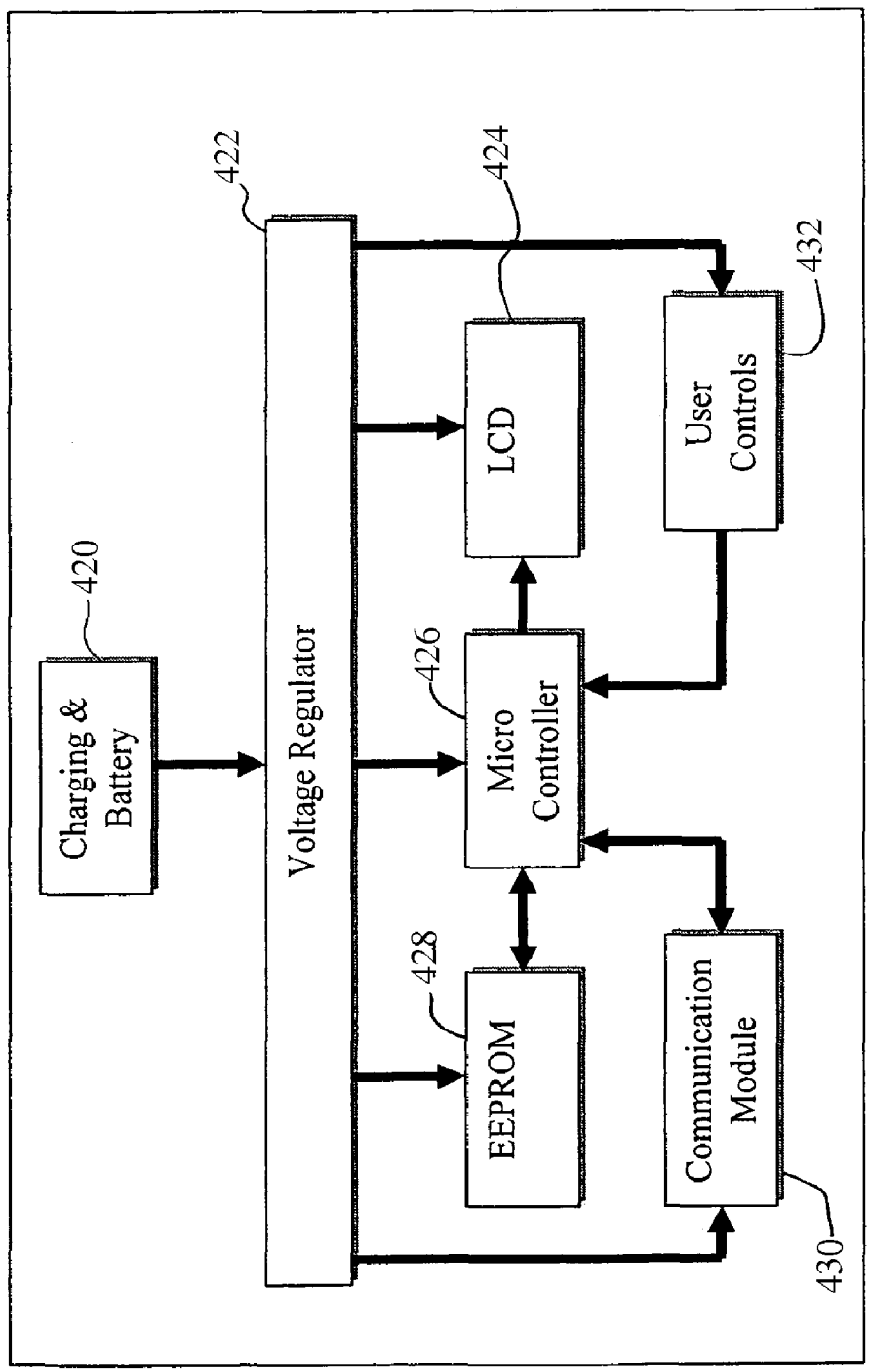
FIG. 18 is a block diagram of a handset used to control an irrigation controller.

FIGS. 17 and 18 refer to handset 3 illustrated with the irrigation controller in FIG. 1. FIG. 17 is a perspective diagram illustrating one embodiment of a handset 3 that can be used to control the irrigation controller 1 illustrated in FIG. 1. FIG. 18 illustrates a block diagram of a handset 3 that can be used to control an irrigation controller 1, according to one embodiment. As shown in FIG. 17, the handset 3 includes a housing 404, a display 402 and a user interface 408. The display 402 in this embodiment is an LCD, but other displays suitable for conveying information to a user can also be used in the handset 3. The user interface 408 comprises five buttons 406 (up, down, left, right, select) which are used to input commands and information into a microcontroller 426 (Figure 18) using corresponding information that is displayed on the display 402. They interface to the microcontroller. When a button is pressed, an interrupt is generated in the microcontroller 426. This can wake up the microcontroller 426 from sleep mode. The handset 3 interfaces with the irrigation controller 1 via a wireless communication link, e.g., by using a radio. In some embodiments, the only way to interface with the irrigation controller 1 is through the handset 3. In other embodiments, an irrigation controller 1 can be accessed through its communication module 10 configured with a user interface. In some embodiments, the handset 3 is configured to interface with up to 99 controllers, where in other embodiments the handset is configured to interface 100 or more controllers.

Referring now to FIG. 18, the handset 3 comprises a charging and battery module 420 configured so a power adapter can plug into charging circuitry to recharges a battery (e.g., a NiMH battery). The battery module 420 supplies a voltage regulator 422 with electrical power to operate the handset 3.

The voltage regulator 422 provides regulated voltage of 3.3 volts to an EEPROM 428, a microcontroller 426, an LCD module 424, a communication module 430, and a user control module 432.

The EERPOM 428 serves as external memory for the microcontroller 426. Graphical information displayed on the LCD display 402 takes up a lot of storage space and can be stored on an EEPROM chip instead of the microcontroller 426. In one embodiment, the EEPROM chip p holds 256K bits of data.

The LCD module 424 is a graphic display module. In this embodiment, the LCD display 402 has a resolution of 128× 128 pixels. The microcontroller 426 communicates to the LCD module 424 though an interface (e.g., serial peripheral interface "SPI"). The graphical information that appear on the LCD display 402 are stored in the EEPROM 428. The microcontroller 426 reads data from the EERPOM 428 and then communicates it to the LCD module 428 to be displayed on the LCD display 402.

Voltage is regulated at 3.3V for the entire system. Voltage comes from either the battery or a 12V DC power adapter. A power feed goes directly into the microcontroller 426 which needs constant power to run a real-time clock (RTC). In some embodiments, a 32.768 kHz crystal is attached to the microcontroller 426 and interrupts a timer once every minute. The microcontroller 426 then updates the RTC, keeping track of time and date information. Other power feeds to the rest of the system can be turned off when not in use. This greatly reduces power usage, since the handset 3 is normally not in use.

Two methods of voltage regulation include: switching and linear regulation. Switching regulators are typically much more efficient than linear. Switching regulators can achieve efficiencies in the high ninety percents. However, they require a minimum quiescent current to keep running. They also have much higher cost. Linear regulators are far less efficient. Their efficiency is closer to fifty/sixty percent. However, they can offer lower quiescent current than switching regulators and are much cheaper. Even though the linear regulator is less efficient, it can draw less current overall. Having two voltage regulators, a linear regulator for the system and a switching regulator for the radio would provide better performance, however, such an implementation can be more expensive to manufacture.

The microcontroller 426 is configured to display graphical information to the LCD 402 that is used to facilitate a user in entering control information using the user controls 432 or display information that is received from the irrigation controller 1 through the communication module 430. The microcontroller 426 also is configured to receive information from a user through the user controls 432 and transmit operational signals relating to the received information to the irrigation controller 1 such that a user can program the operations of the irrigation controller 1. The microcontroller 426 also monitors the voltage level of the battery. When the battery is fully charged, the microcontroller 426 disables charging the battery.

The microcontroller 426 controls the functionality of the handset. It controls and monitors all of the circuitry. The microcontroller 426 can perform various functions, including to monitor battery voltage, enable/disable battery charging, read/write info to/from the EEPROM 428, write graphics to the LCD module 424, read in user input from the user controls 432, send/receive data through the communication module 430, track time and date information, and display screens for all features (programs, manual run, tests, status, etc). For example, the microcontroller can display various graphical information or screens on the LCD display 402. If the displayed screen requests an input from the user, the microcontroller 426 can record the user's input and perform the selected action. The microcontroller 426 also has accesses to the battery and it can sample the voltage at a programmed rate. The microcontroller 426 can detect if an external voltage is present, and can start charging the battery if necessary. Once a user is done using the microcontroller 426, it will disable most of the handset's components. The microcontroller 426 will put itself into a deep sleep until a button is pressed to wake it up. This will conserve energy and allow the microcontroller 426 to last longer between recharging.

In any of the processes specifically described above, one or more steps may be added, or a described step deleted, without departing from at least one of the aspects of the invention. Those of ordinary skill in the art would understand that information and signals may be represented using any of a variety of different technologies and techniques. For example, data, instructions, commands, information, signals, bits, and symbols, that may be referenced throughout the above description may be represented by voltages, currents, electromagnetic waves, magnetic fields or particles, optical fields or particles, or any combination thereof.

Those of ordinary skill would further appreciate that the various illustrative logical blocks, modules, and algorithm steps described in connection with the examples disclosed herein may be implemented as electronic hardware, firmware, computer software, middleware, microcode, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed methods.

The various illustrative logical blocks, components, modules, and circuits described in connection with the examples disclosed herein may be implemented or performed in various embodiments with a computer, microcontroller, a digital signal microcontroller (DSP), an application specific integrated circuit (ASIC), a field programmable gate array (FPGA) or other programmable logic device, discrete gate or transistor logic, discrete hardware components, or any combination thereof designed to perform the functions described herein. A general purpose microcontroller may be a microcontroller, but in the alternative, a state machine. A microcontroller may also be implemented as a combination of computing devices, e.g., a combination of a DSP and a microcontroller, a plurality of microcontrollers, one or more microcontrollers in conjunction with a DSP core, or any other such configuration.

The steps of a method or algorithm described in connection with the examples disclosed herein may be embodied directly in hardware, in a software module executed by a microcontroller, or in a combination of the two. A software module may reside in RAM memory, flash memory, ROM memory, EPROM memory, EEPROM memory, registers, a hard disk, or any other form of storage medium known in the art. An exemplary storage medium is coupled to the microcontroller such that the microcontroller can read information from, and write information to, the storage medium. In some embodiments, the storage medium may be integral to the microcontroller. The microcontroller and the storage medium may reside in an Application Specific Integrated Circuit (ASIC).

Aspects of the irrigation controller embodiments described herein can beneficially be implemented in a variety of irrigation controllers and irrigation systems. Each embodiment can stand alone, or a plurality of embodiments can be combined to provide greater levels of temperature control and thermal stabilization. It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

The invention claimed is:

1. An irrigation controller, comprising:
  a power system for providing electrical energy, comprising
    a photovoltaic power module; and
    a power storage device comprising a capacitive module connected across said photovoltaic power module, said capacitive module stores electrical energy generated by said photovoltaic power module;
  a control system housed with said power system, comprising:
    a wireless transceiver that receives operational signals and provides data to a wireless receiver;
    a timing component to provide a real-time clock time signal; and
    a computer programmed to
      operate at least one irrigation flow device based at least in part on said operational signals and said time signal, said computer further monitors a voltage level of said power storage device and
      operate said transceiver in an activated state when said monitored voltage level exceeds a transceiver threshold voltage level, and operate said transceiver in a deactivated state when said monitored voltage level is less than the transceiver threshold voltage level, and
      perform an orderly shutdown of said control system when said monitored voltage level falls below a system shutdown threshold voltage, and perform a start-up procedure of said control system when the control system is in a shutdown state and the monitored voltage level exceeds a system start threshold voltage,
    the system start threshold voltage being greater than the system shutdown threshold voltage;
    a boost module configured to receive electrical energy from the power system at a first voltage level and produce an output voltage at a second voltage level; and
    an actuation module comprising at least one capacitor, said actuation module configured to receive electrical energy from said boost module at the second voltage level to charge said at least one capacitor, said actuation module further configured to provide an output pulse to operate at least one irrigation control device connected to the irrigation controller;

wherein the irrigation controller generates electrical energy by said photovoltaic device, the electrical energy is stored in said capacitive module to operate the irrigation controller, during programming of the irrigation controller, and to operate said transceiver, independent of another power source.

2. The irrigation controller of claim 1, further comprising a voltage regulator configured to receive electrical energy from said power system and provide a regulated voltage output to said computer and said transceiver.

3. The irrigation controller of claim 2, wherein said voltage regulator comprises a low-dropout regulator.

4. The irrigation controller of claim 1, further comprising:
a linear voltage regulator configured to receive electrical energy from said power system and provide a regulated voltage output to said computer, and
a switching voltage regulator configured to receive electrical energy from said power system and provide a regulated voltage output to said transceiver.

5. The irrigation controller of claim 1, wherein said computer comprises a microcontroller.

6. The irrigation controller of claim 1, wherein said timing component comprises a real time clock.

7. The irrigation controller of claim 1, wherein said second voltage level is greater than the first voltage level.

8. The irrigation controller of claim 1, wherein said irrigation control device comprises a solenoid valve.

9. The irrigation controller of claim 1, wherein said capacitive module comprises at least one capacitor connected across the photovoltaic power module.

10. The irrigation controller of claim 1, wherein said capacitive module comprises at least two capacitors connected in series and connected across the photovoltaic power module.

11. The irrigation controller of claim 10, wherein said capacitive module further comprises:
a diode connected in parallel with said at least two capacitors; and
a cell balancing module connected to each of said at least two capacitors and configured to maintain a consistent voltage across each of said at least capacitors.

12. The irrigation controller of claim 1, wherein said photovoltaic power module comprises a surface area of about 5700 mm$^2$ or less.

13. The irrigation controller of claim 1, wherein the capacitive module comprises one or more capacitors electrically connected in parallel across said photovoltaic power module.

14. The system of claim 1, wherein the system shutdown threshold voltage is 2.5 volts or less.

15. The system of claim 1, wherein the system shutdown threshold voltage is 2 volts or less.

16. The system of claim 1, wherein the transceiver threshold voltage level is 4.2 volts or more.

17. The irrigation controller of claim 1, wherein the transceiver comprises
an interface configured to input operational signals; and
an LED screen configured to display operational information related to the received operational signals.

18. The system of claim 1, wherein the output pulse comprises a pulse of between 5 volts and 15 volts.

19. The system of claim 1, where the output pulse comprises a pulse of 10 volts.

20. The system of claim 1, further comprising:
means for charging an actuation capacitor for operating a solenoid actuated valve using said electrical energy storing means;
means for receiving one or more operational signals using energy stored in the capacitive module;
means for providing time information; and
means for providing event interrupts,
wherein said operating means is configured to use said one or more operational signals, said time information, and said event interrupts to operate said solenoid actuated valve at a predetermined time to control a flow of water in the irrigation system.

21. The system of claim 20, further comprising:
means for monitoring a voltage level of the capacitive module; and
means for implementing a power saving process based on said monitored voltage level.

22. The irrigation controller of claim 1, wherein the control system is further configured to transmit a signal indicative of a condition of the irrigation controller.

23. The irrigation controller of claim 1, wherein the control system is further configured to transmit information relating to an event that occurred in the irrigation controller.

24. A method of operating an irrigation controller to control one or more irrigation devices in an irrigation system, comprising:
producing electrical energy from light;
storing said electrical energy in a capacitive module;
monitoring a voltage level of the stored electrical energy;
receiving operational signals via a wireless transceiver and providing data to a wireless receiver via the transceiver;
programming a control system of said irrigation controller, the control system housed with said transceiver, wherein said programming comprises using the received operational signals and a real-time clock time signal while powering the irrigation controller using said stored electrical energy independent of another power source;
operating said transceiver in an activated state when said monitored voltage level exceeds a transceiver threshold voltage level, and operating said transceiver in a deactivated state when said monitored voltage level is less than the transceiver threshold voltage level;
performing an orderly shutdown of said control system when said monitored voltage level falls below a system shutdown threshold voltage, and performing a start-up procedure of said control system when the control system is in a shutdown state and the monitored voltage level exceeds a system start threshold voltage, the system start threshold voltage being greater than the system shutdown threshold voltage;
receiving electrical energy at a first voltage level and producing an output voltage at a second voltage level via a boost module;
receiving electrical energy at the second voltage level from the boost module via an actuation module to charge at least one capacitor and providing an output pulse via the actuation module to operate at least one irrigation control device connected to the irrigation controller; and
operating said irrigation controller including said transceiver and said control system using said stored electrical energy independent of another power source.

25. The method of claim 24, further comprising:
charging a capacitive module for actuating an irrigation device using said stored electrical energy;
receiving operational signals comprising operational information for operating said irrigation device;

receiving timing signals;

discharging said capacitor to actuate the irrigation device at a predetermined time based on said operational information and said timing signals.

26. The method of claim 25, wherein receiving operational signals comprises receiving said operational signals over a wireless communication link.

27. The method of claim 24, wherein performing an orderly shutdown of said control system comprises configuring the system for a graceful shutdown to a sleep state.

28. The method of claim 24, further comprising transmitting a signal indicative of a condition of the irrigation controller.

29. The method of claim 24, further comprising transmitting information relating to an event that occurred in the irrigation controller.

30. An irrigation controller for controlling an irrigation system, comprising:

means for producing electrical energy from light;

means for storing said electrical energy in a capacitive module;

means for monitoring a voltage level of the stored electrical energy;

a wireless transceiver that receives operational signals and provides data to a wireless receiver;

means for boosting voltage level configured to receive electrical energy at a first voltage level and produce an output voltage at a second voltage level;

means for actuating configured to receive electrical energy from said boosting means at the second voltage level to charge at least one capacitor, said actuating means further configured to provide an output pulse to operate at least one irrigation control device connected to the irrigation controller; and means for controlling said irrigation controller using the received operational signals and a real-time clock time signal while powering the irrigation controller using said stored electrical energy independent of another power source, said controlling means housed with said wireless transceiver, said controlling means programmed to operate said transceiver in an activated state when said monitored voltage level exceeds a transceiver threshold voltage level, and operate said transceiver in a deactivated state when said monitored voltage level is less than the transceiver threshold voltage level;

perform an orderly shutdown of said controlling means when said monitored voltage level falls below a system shutdown threshold voltage, and perform a start-up procedure of said controlling means when the controlling means is in a shutdown state and the monitored voltage level exceeds a system start threshold voltage, the system start threshold voltage being greater than the system shutdown threshold voltage; and operate said irrigation controller using said stored electrical energy independent of another power source.

* * * * *